United States Patent [19]

Wada

[11] Patent Number: 5,237,865
[45] Date of Patent: Aug. 24, 1993

[54] FLOW RATE MEASURING APPARATUS

[75] Inventor: Ichiro Wada, Yokohama, Japan

[73] Assignee: Kabushiki Kaisha Toshiba, Kawasaki, Japan

[21] Appl. No.: 842,971

[22] Filed: Feb. 28, 1992

Related U.S. Application Data

[63] Continuation of Ser. No. 363,852, Jun. 9, 1989, Pat. No. 5,136,882.

[30] Foreign Application Priority Data

| Aug. 17, 1987 | [JP] | Japan | 62-203115 |
| Dec. 11, 1987 | [JP] | Japan | 62-187806[U] |
| Jul. 14, 1988 | [JP] | Japan | 63-92511[U] |

[51] Int. Cl.⁵ .............................................. G01F 15/00
[52] U.S. Cl. ............................................................ 73/198
[58] Field of Search .............. 134/22.12, 102.1, 102.2, 134/166 C, 169 C; 73/861.12, 198

[56] References Cited

U.S. PATENT DOCUMENTS

| 1,813,100 | 7/1931 | Swindle | 73/861.62 X |
| 2,222,516 | 11/1940 | Powell et al. | 134/22.12 X |
| 3,180,759 | 4/1965 | Falk | 134/22.12 |
| 3,479,873 | 11/1968 | Hermanns | 73/861.12 |
| 3,664,191 | 5/1972 | Hermanns | 73/861.12 |
| 4,543,191 | 9/1985 | Stewart et al. | 134/166 C X |
| 4,645,542 | 2/1987 | Scharton | 134/22.12 X |
| 5,136,882 | 8/1992 | Wada | 73/198 |

FOREIGN PATENT DOCUMENTS

| 3934813 | 11/1964 | Japan . |
| 57-49779 | 11/1982 | Japan . |

*Primary Examiner*—Herbert Goldstein
*Attorney, Agent, or Firm*—Oblon, Spivak, McClelland, Maier & Neustadt

[57] ABSTRACT

A flow rate measuring apparatus includes a measuring pipe in which a fluid to be measured flows, a flowmeter for measuring a flow rate of the fluid to be measured flowing in the measuring pipe, and a cleaning flow generator for removing an adhesive substance in the measuring pipe by using the fluid to be measured, thereby correctly performing flow rate measurement by the measuring pipe. The cleaning generator removes adhesive substances by charging a high-pressure gas into the flow path of the fluid to be measured.

2 Claims, 26 Drawing Sheets

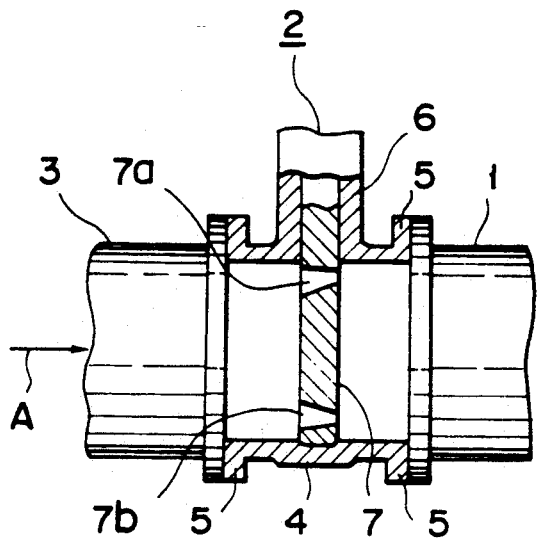
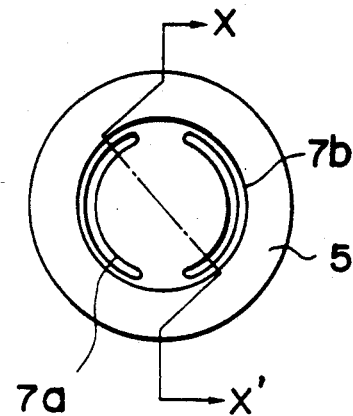
FIG. 1A    FIG. 1B
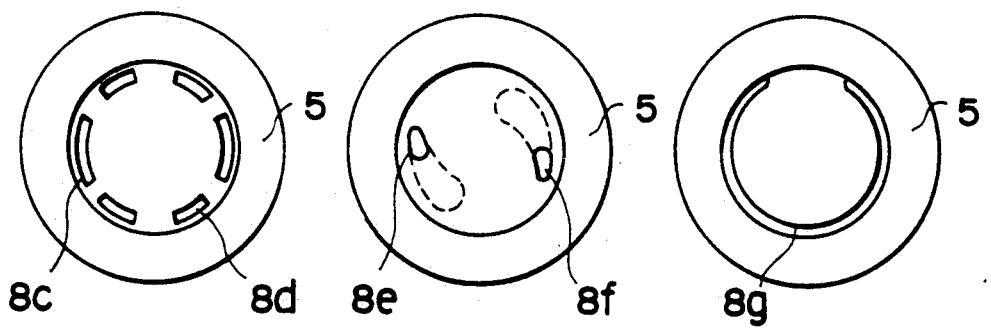
FIG. 2A    FIG. 2B    FIG. 2C

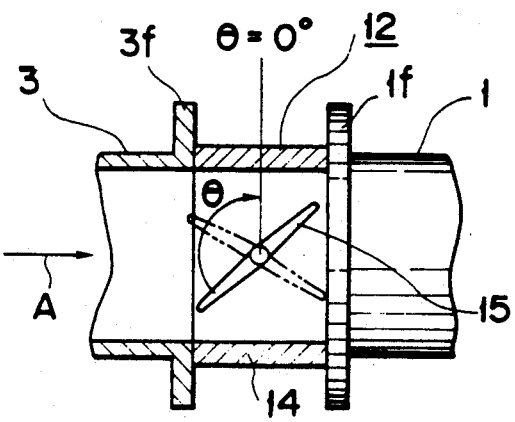
F I G. 3
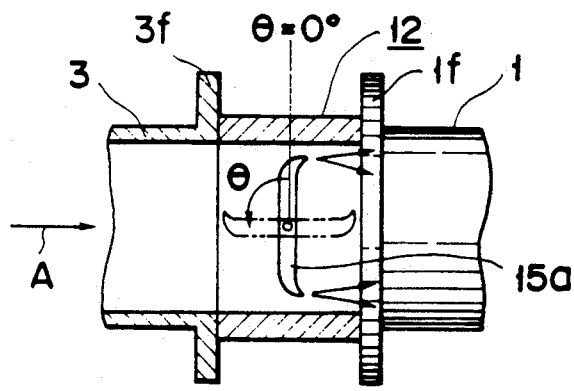
F I G. 4
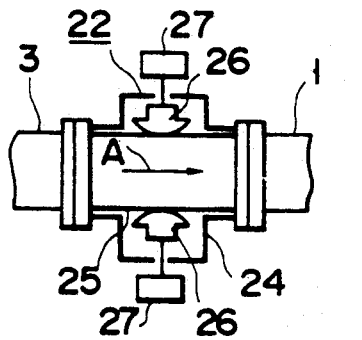 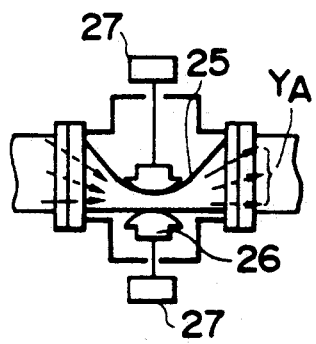 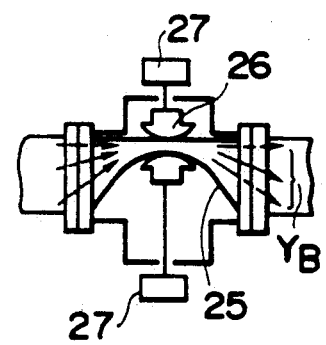
F I G. 5A    F I G. 5B    F I G. 5C

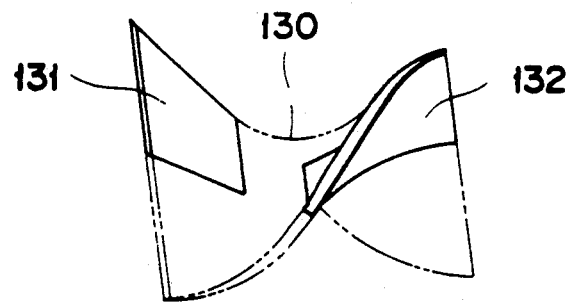
FIG. 11
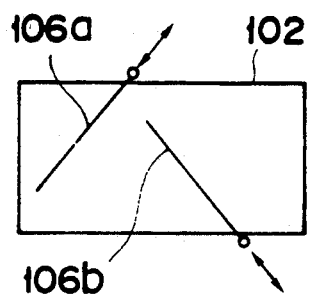   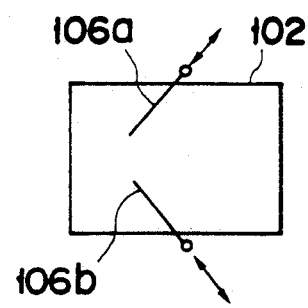   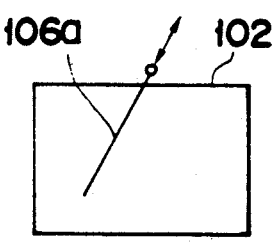
FIG. 12A   FIG. 12B   FIG. 12C
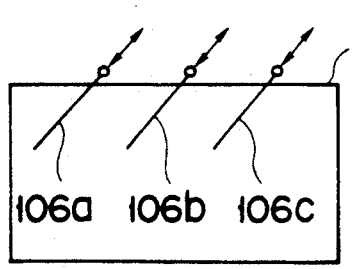   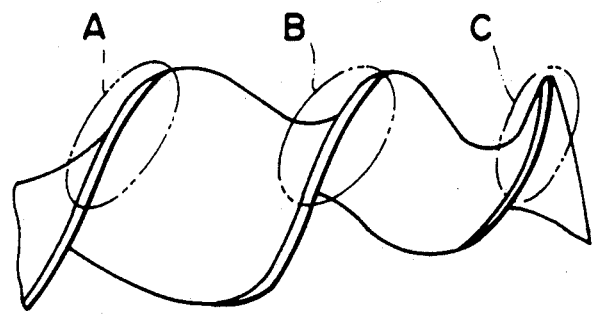
FIG. 13   FIG. 14
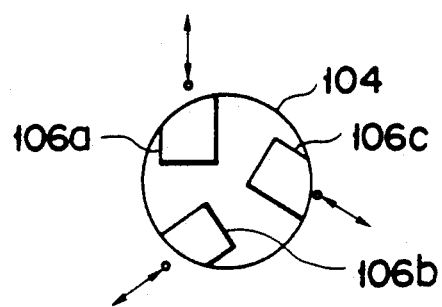
FIG. 15

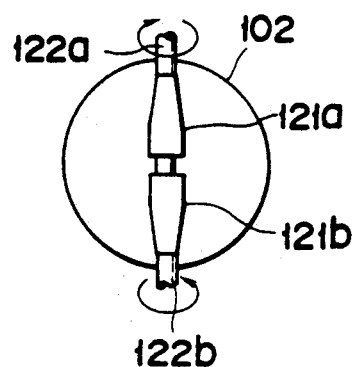
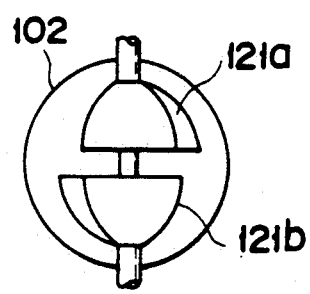
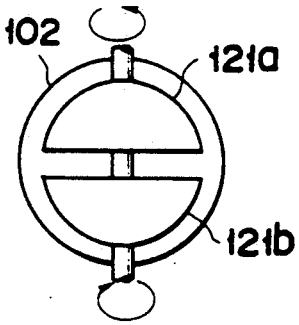
FIG. 19A    FIG. 19B    FIG. 19C
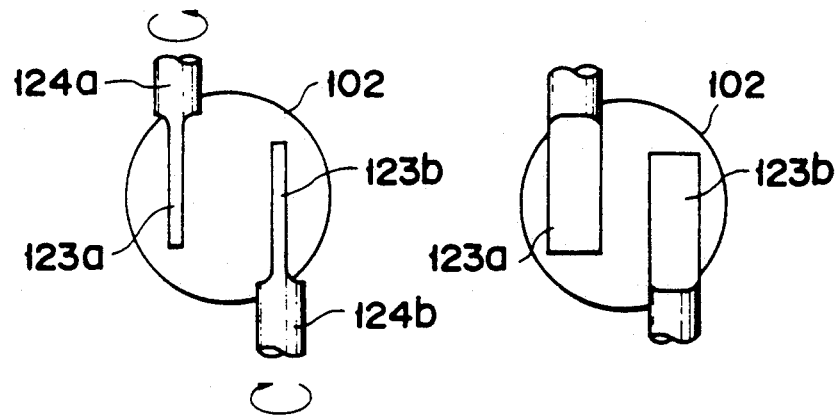
FIG. 20A    FIG. 20B

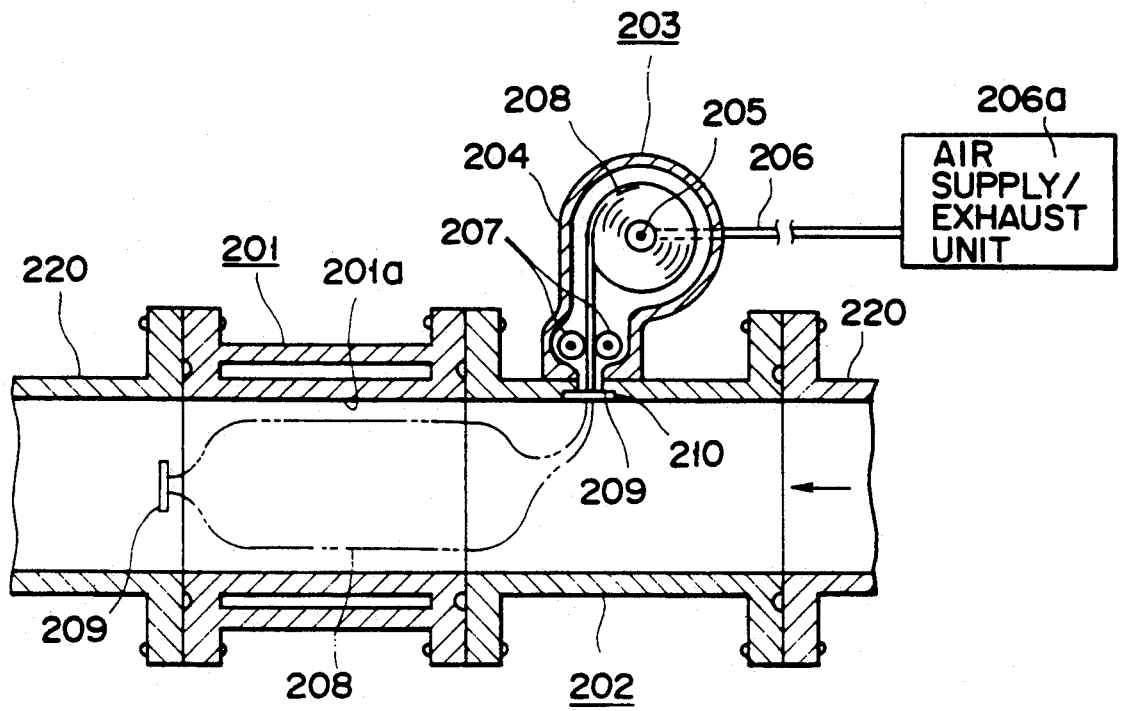
FIG. 25
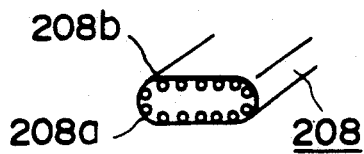
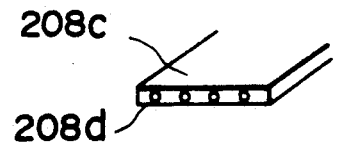
FIG. 26    FIG. 27

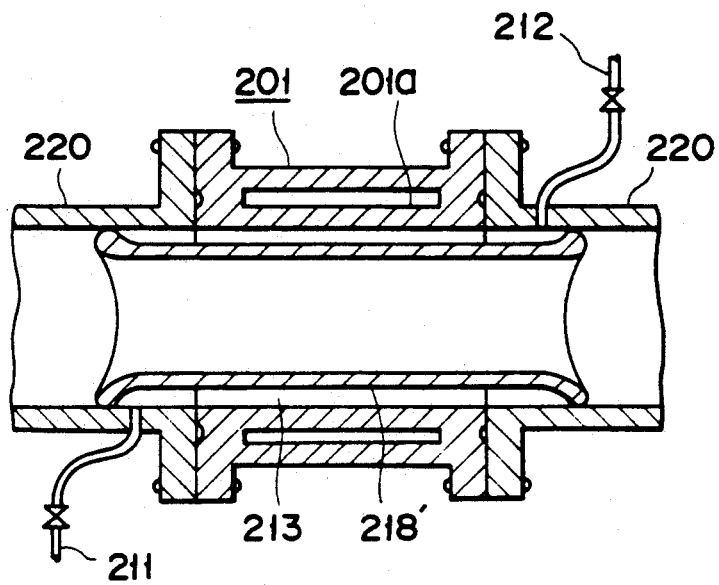
F I G. 30
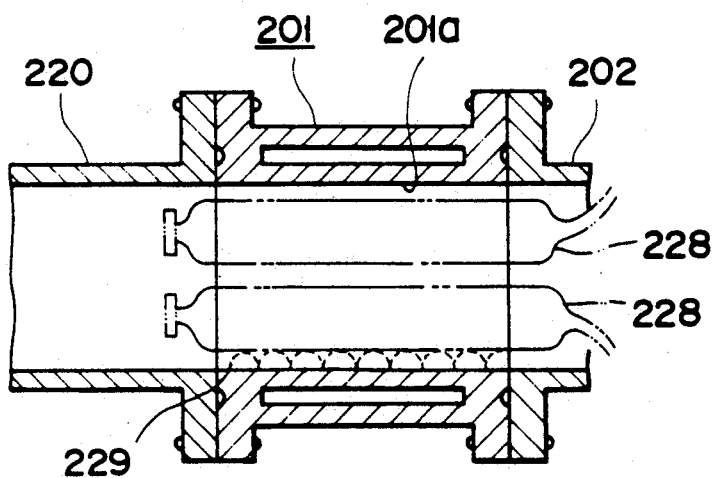
F I G. 31

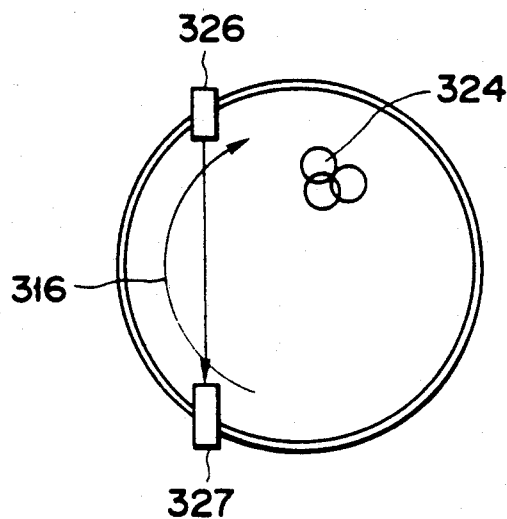
F I G. 37A
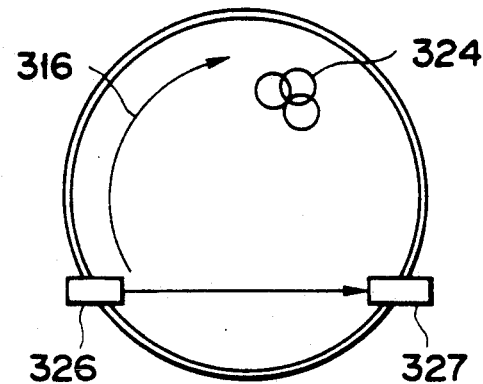
F I G. 37B
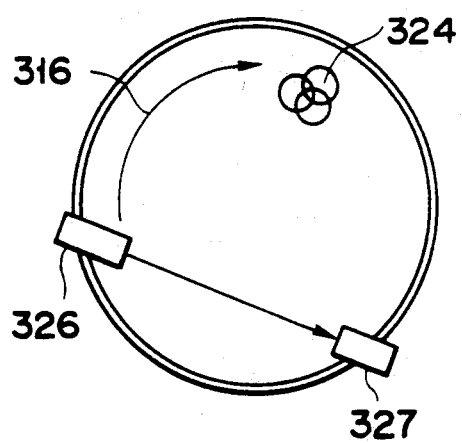
F I G. 37C
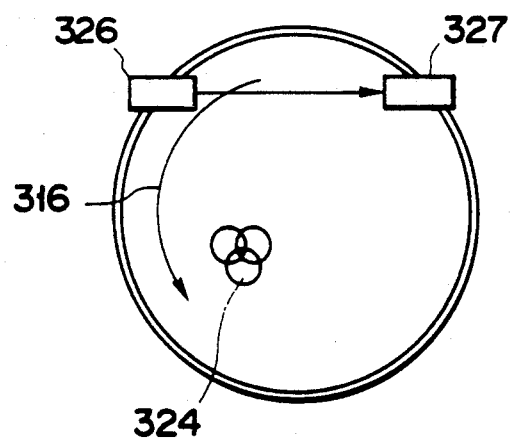
F I G. 37D

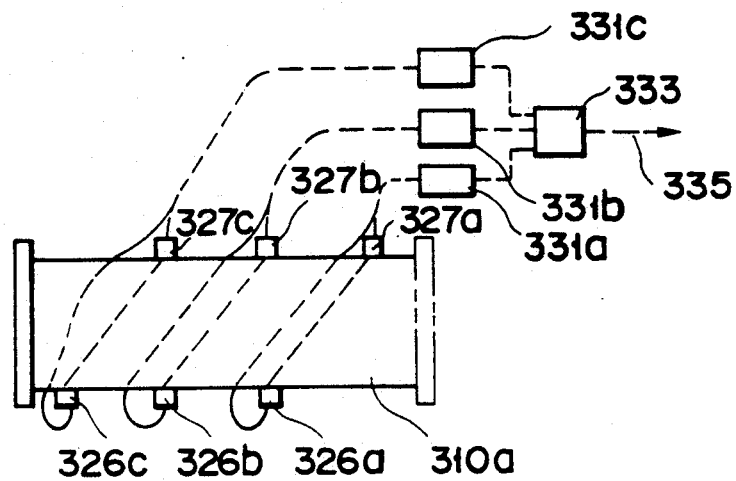
F I G. 38
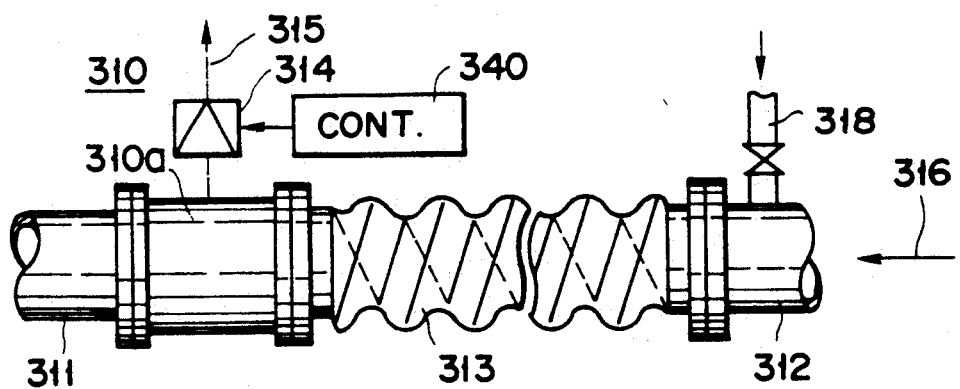
F I G. 39

FLOW RATE MEASURING APPARATUS

This is a continuation of application Ser. No. 07/363,852, filed on Jun. 9, 1989, now U.S. Pat. No. 5,136,882.

BACKGROUND OF THE INVENTION

1. Field of the Invention

The present invention relates to a flow rate measuring apparatus suitable for measuring a flow rate of a fluid such as sewage, human waste, sludge, or organic drainage which tends to produce an adhesive substance on a pipe and, more particularly to a flow rate measuring apparatus capable of removing an adhesive substance on a measuring pipe without removing pipes.

2. Description of the Related Art

Various types of flow rate measuring apparatuses are used in various places. An example of the places in which the flow rate measuring apparatus is used is a sewage disposal plant. In the sewage disposal plant or the like, various types of substances adhere on the inner surface of the measuring pipe (if the measuring pipe has a lining, the inner surface of the lining) of a flowmeter due to properties of a fluid whose flow rate is to be measured. When the flowmeter is an electromagnetic flowmeter and an adhesive substance has high conductance, the adhesive substance resistively connects electrodes for detecting an induced electromotive force and decreases an indication value of the flowmeter. This adhesive substance deteriorates over time due to bacteria, microorganisms, or the like into a hard cement-like substance consisting of carbon, minerals, and the like in the adhesive substance. Layers of this cement-like substance strongly adhere on the inner surface of the measuring pipe and therefor cannot be easily removed.

In addition, when an adhesive substance decays in summer time, the adhesive substance sometimes deteriorates into a bread-like substance due to a gas generated upon decay. This bread-like adhesive substance hardly transmits an ultrasonic wave. For this reason, when the flow rate measuring apparatus is an ultrasonic flowmeter, it is difficult to perform measurement, or a measurement error occurs. Such a bread-like substance also deteriorates into a hard substance over time and therefore cannot be easily removed.

Such an adhesive substance also poses various problems in a flowmeter except for the electromagnetic flowmeter or the ultrasonic flowmeter. For example, an effective area of a measuring pipe is reduced, and a measurement value error occurs.

These problems are not limited to sewage but arise for an type of fluid although a degree of the problem differs.

For this reason, this adhesive substance must be removed while it can be easily removed. Since, however, a measuring pipe is connected to a pipe system, it is difficult to clean the inner surface of the measuring pipe. Examples of a conventional technique of removing an adhesive substance in a measuring pipe without removing the measuring pipe from a pipe system are: (1) a method of blowing a cleaning solution against electrodes of an electromagnetic flowmeter and their peripheral portions to remove an adhesive substance (Japanese Utility Model Publication No. 57-59937); and (2) a method in which a porous substance is used as a lining material of a measuring pipe and a cleaning solution is injected to remove an adhesive substance (Japanese Utility Model Publication No. 57-49779). In these techniques, however, since electrodes and their peripheral portions of an electromagnetic flowmeter are mainly cleaned, only a part of an adhesive substance can be removed. Therefore, (1) a problem in which electrodes of an electromagnetic flowmeter are resistively connected, (2) a problem in which transmission of an ultrasonic wave is interfered, and (3) a problem in which an effective area of a measuring pipe is reduced are basically left unsolved. In addition, in the above cleaning methods, a measuring pipe must be emptied upon cleaning in order to achieve a sufficient cleaning effect, resulting in an inconvenient operation.

SUMMARY OF THE INVENTION

The present invention has been made in consideration of the above situation and has as its object to provide a flow rate measuring apparatus capable of efficiently removing an adhesive substance in a measuring pipe without removing the flow rate measuring apparatus from a pipe system.

In order to achieve the above object, a flow rate measuring apparatus according to the present invention comprises:

a flow rate measuring means, including a measuring pipe means in which a fluid to be measured flows, for measuring a flow rate of the fluid to be measured flowing in said measuring pipe means; and a removing means, arranged on an upstream side of the flow rate measuring means, for removing an adhesive substance in the measuring pipe means by using the fluid to be measured so that the flow rate measuring means can correctly measure a flow rate.

As described above, various adhesive substances adhere on the inner surface of the measuring pipe means, deteriorate due to an influence of microorganisms or the like, and resistively connect electrodes of an electromagnetic flowmeter. As a result, an indication value is decreased, transmission of an ultrasonic wave in the measuring pipe means is interfered, or flow rate measurement becomes difficult. With the above arrangement, however, such an adhesive substance especially problematic in a sewage disposal plant can be easily removed without removing a flowmeter from pipes, thereby enabling correct flow rate measurement.

BRIEF DESCRIPTION OF THE DRAWINGS

FIGS. 1A, 1B, 2A, 2B, 2C, 3, 4, 5A, 5B, 5C, 6A, 6B, 6C, 6D, 7A, 7B, 8A, 8B, 9A, and 9B are views showing an arrangement of a cleaning flow generator according to a first embodiment of the present invention;

FIGS. 11, 23, and 24 are views for explaining an operation of a turning flow generator shown in FIGS. 10A and 10B;

FIGS. 12A, 12B, 12C, 13, 15, 16A, 16B, 17A, 17B, 18A, 18B, 19A, 19B, 19C, 20A, 20B, 21, and 22 are views showing modifications of the turning flow generator shown in FIGS. 10A and 10B;

FIG. 14 is a view for explaining an operation of an arrangement shown in FIG. 13;

FIG. 25 is a longitudinal sectional view showing an arrangement of a flow rate measuring apparatus according to a third embodiment of the present invention;

FIG. 26 is a perspective view for explaining an arrangement of a balloon shown in FIG. 25;

FIG. 27 is a perspective view for explaining a modification of a part of the balloon not to be inflated;

FIGS. 28A, 28B, 29, 30, and 31 are views for explaining modifications of the flow rate measuring apparatus shown in FIG. 25;

FIGS. 36, 37A, 37B, 37C, and 37D are views showing applications of the flow rate measuring apparatus shown in FIG. 32;

FIGS. 38, 39, 40, 41, 42A, 42B, 43, and 44 are views showing modifications of the flow rate measuring apparatus shown in FIG. 32;

DETAILED DESCRIPTION OF THE PREFERRED EMBODIMENTS

Figure 6A:
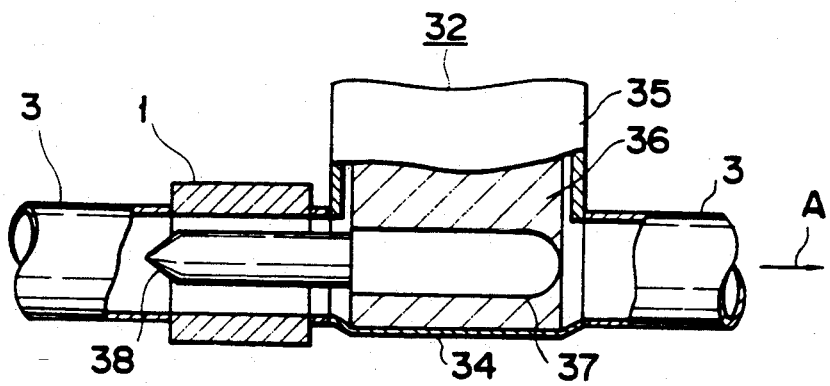

Six embodiments of the present invention will be described below with reference to the accompanying drawings. In the following description, for better understanding, the same reference numerals denote the same parts in a plurality of drawings, and a detailed description thereof will be omitted in later drawings. 1st EMBODIMENT FIGS. 1A and 1B show a first example of a flow rate measuring apparatus according to a first embodiment of the present invention. Referring to FIG. 1A, a cleaning flow generator 2 is connected to the downstream side of a pipe 3 in which a fluid to be measured flows in a direction indicated by an arrow A. A flowmeter 1 is connected to the downstream side of the generator 2. The generator 2 comprises a flow control mechanism including a cylindrical body 4, a vane 7, and a moving mechanism for the vane 7. The body 4 has mounting flanges 5 at its both ends, and the flanges 5 are connected to the flowmeter 1 and the pipe 3. The moving mechanism moves the vane 7 to a position for interrupting a flow path of a fluid at the center of the body 4 and to a position at which the vane 7 is separated from the flow path and housed in a housing portion 6 formed in the body. The moving mechanism is, e.g., a screw feeding mechanism. As shown in FIG. 1B, the vane 7 comprises a disk member. Slit-like nozzle holes 7a and 7b are formed in a peripheral portion of the disk member so as to be point-symmetrical about the axis of the disk member and extend along the circumferential direction of the disk member. As shown in FIG. 1A, a sectional shape of each of the nozzle holes 7a and 7b is tapered such that a slit width is gradually decreased from the upstream to downstream side. The nozzle holes 7a and 7b are directed to a wall of a measuring pipe of the flowmeter 1. Note that FIG. 1A is taken along a line X—X' in FIG. 1B.

In the flow rate measuring apparatus having the above arrangement, the vane 7 is normally housed in the housing portion 6. At this time, the vane 7 has almost no effect on a fluid flow in the measuring pipe. Therefore, a flow rate of the fluid to be measured can be correctly measured by the flowmeter 1. In order to perform cleaning, the moving mechanism is driven to move the vane 7 downward from the housing portion 6 to interrupt the flow path. The fluid in the measuring pipe is injected from the nozzle holes 7a and 7b in the vane 7 toward the wall of the measuring pipe of the flowmeter. As a result, an adhesive substance on the inner surface of the measuring pipe of the flowmeter 1 is removed.

The shape of the nozzle of the vane 7 is not limited to that shown in FIG. 1B but can be variously modified and carried out. For example, as shown in FIG. 2A, a plurality of nozzles 8c and 8d can be arranged along the circumference of the vane. In addition, as shown in FIG. 2B, nozzles can be formed to have shapes 8e and 8f capable of injecting a turning flow. Furthermore, as shown in FIG. 2C, a single slit 8g can be formed.

FIG. 3 shows a second example of the flow rate measuring apparatus according to the first embodiment of the present invention. Referring to FIG. 3, a cleaning flow generator 12 is connected to the downstream side of a pipe 3 in which a fluid to be measured flows in a direction indicated by an arrow A. A flowmeter 1 is connected to the downstream side of the generator 12. The generator 12 comprises a flow control mechanism including a body 14, a vane 15, and a vane driving mechanism. The body 14 comprises a flangeless cylinder to be sandwiched and mounted between a flange 1f of the flowmeter 1 and a flange 3f of the pipe 3 (the body may have mounting flanges at its both ends). The vane 15 comprises, e.g., a disk member having a diameter smaller than an inner diameter of the body 14 and has a rotating shaft perpendicular to the axis (flow axis) of the body 14. The vane driving mechanism rotates the vane 15 from a position at which the vane 15 is perpendicular to the flow to a position at which it is parallel to the flow about the rotating shaft. The driving mechanism comprises, e.g., gears mounted on the rotating shaft of the vane 15 and gears at a driving side for driving the worm gear.

In the flow rate measuring apparatus having the above arrangement, $\theta = 90°$ is kept, i.e., the vane 15 is kept parallel to the flow upon flow rate measurement. In this state, the vane 15 has almost no effect on a speed or the like of the fluid to be measured. When the vane 15 is set in a state of $90° > \theta > 0°$ indicated by an alternate long and two short dashed line, a flow speed can be increased especially near a pipe wall illustrated in the lower portion of FIG. 3, thereby removing an adhesive substance in the measuring pipe of the flowmeter 1. When the vane 15 is set in a state of $180° > \theta > 90°$ indicated by a solid line, a flow speed can be increased especially near a pipe wall illustrated in the upper portion of FIG. 3, thereby removing an adhesive substance. Therefore, when the position of the rotating shaft of the vane 15 is set such that electrodes or the like of an electromagnetic flowmeter are located at a position to which a flow having an increased speed is directed, an adhesive substance on the electrodes and their peripheral portions can be mainly removed.

FIG. 4 shows a modification of the apparatus shown in FIG. 3. Referring to FIG. 4, the outer diameter of a vane 15a is set smaller than the inner diameter of a body 14, and the circumferential edge of the vane 15a is curved so that a fluid is radially guided from the center to the periphery of the vane. In this modification, upon flow rate measurement, the vane 15a is kept in a state of $\theta = 90°$ indicated by an alternate long and two short dashed line. Upon cleaning, the vane 15a is kept in a position of $\theta = 0°$ indicated by a solid line. As a result, the speed of a flow near the measuring pipe wall of the flowmeter 1 is increased to generate a cleaning flow, thereby removing an adhesive substance.

In each of the examples shown in FIGS. 3 and 4, if fiber-like materials are contained in the fluid to be measured, the materials may be wound around the vane 15 or 15a. In this case, a housing portion capable of housing the vane 15 or 15a together with the rotating shaft may be formed in the body 14 so that the vane 15 or 15a can be housed in the housing portion when cleaning is not performed.

FIGS. 5A, 5B, and 5C show a fourth example of the flow rate measuring apparatus according to the first embodiment of the present invention. Referring to FIGS. 5A, 5B, and 5C, a cleaning flow generator 22 is connected to the downstream side of a pipe 3 in which a fluid to be measured flows in a direction indicated by an arrow A, and a flowmeter 1 is connected to the downstream side of the generator 22. The generator 22 comprises a body 24 having mounting flanges at its both ends, a flexible pipe 25, arranged in the body 24, for flowing the fluid to be measured, a pair of press metal pieces 26, and a mechanism 27 for moving the metal pieces forward/backward. The press metal pieces 26 are arranged in the body 24 and moved forward/backward by the mechanism 27 in a direction perpendicular to the flow axis of the fluid to be measured. The mechanism 27 for moving the metal pieces 26 forward/backward is, e.g., a screw feeding mechanism. The distal end (press surface) of each press metal piece 26 is curved like a vice of a pinch valve.

In the flow rate measuring apparatus having the arrangement shown in FIGS. 5A, 5B, and 5C, the flexible pipe 25 is normally kept in a state not narrowed by the metal pieces 26 (a state shown in FIG. 5A). Therefore, a flow rate can be correctly measured. In order to perform cleaning, one of the metal pieces 26 is moved forward without moving the other metal piece, as shown in FIG. 5B or 5C. Upon forward movement of the metal piece 26, the flexible pipe 25 is biased and narrowed to generate a cleaning flow having an increased speed as indicated by an arrow YA or YB shown in FIG. 5B or 5C, respectively, thereby removing an adhesive in the measuring pipe of the flowmeter 1.

Figure 6B:
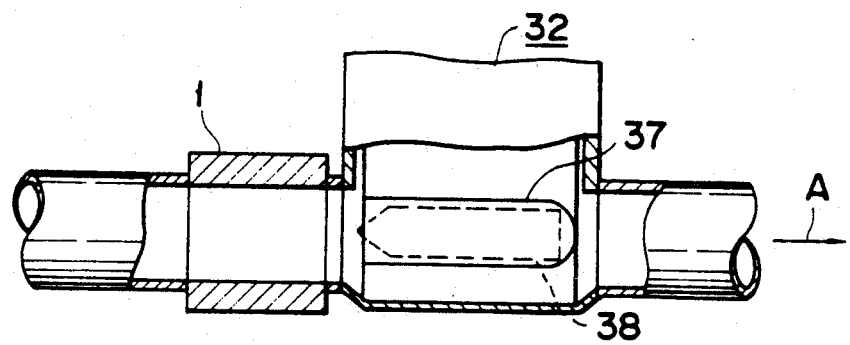
Figure 6C:
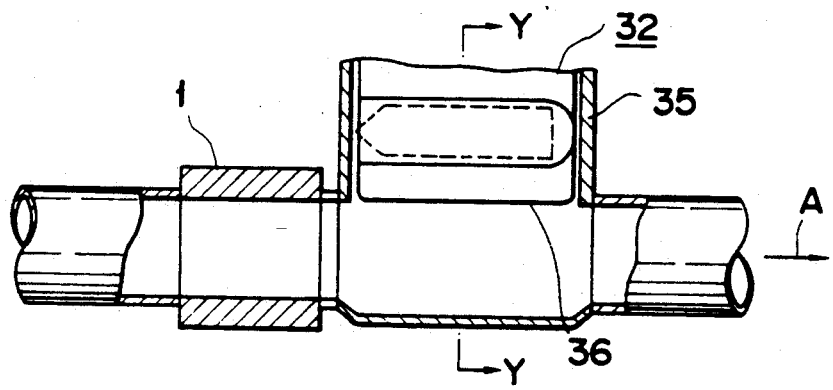
Figure 6D:
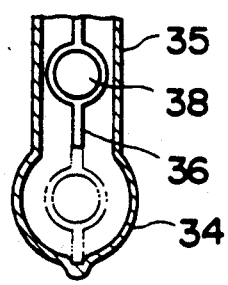

FIGS. 6A, 6B, 6C, and 6D show a fifth example of the flow rate measuring apparatus according to the first embodiment of the present invention. Note that FIG. 6D is a sectional view taken along a line Y—Y in FIG. 6C. As shown in FIGS. 6A to 6C, a cleaning flow generator 32 is arranged on the upstream side of a flowmeter 1. The generator 32 comprises a cylindrical body 34, a housing portion 35 arranged in an upper portion of the body 34, a vane 36, and a mechanism for driving the vane 36. The vane 36 includes a cylinder 37 and a piston 38 inserted in the cylinder 37. Upon cleaning, the vane 36 is moved downward from the housing portion 35 into the body 34, as shown in FIG. 6B. The piston 38 is then pushed outward from the cylinder 37 to be concentrically inserted in the measuring pipe of the flowmeter 1, as shown in FIG. 6C. Upon cleaning, a flow path in the measuring pipe of the flowmeter 1 is narrowed by the piston 38. As a result, the flow speed of a fluid near the inner wall of the measuring pipe is increased to generate a cleaning flow, thereby removing an adhesive substance. In order to measure a flow rate, the piston 38 is housed in the cylinder 37 as shown in FIG. 6B, and the vane 36 is moved upward into the housing portion 35 of the body 34 as shown in FIGS. 6C and 6D. In this state, the fluid flowing in the body 34 is not affected by the vane 36, and therefore a correct flow rate can be measured.

Figure 7B:
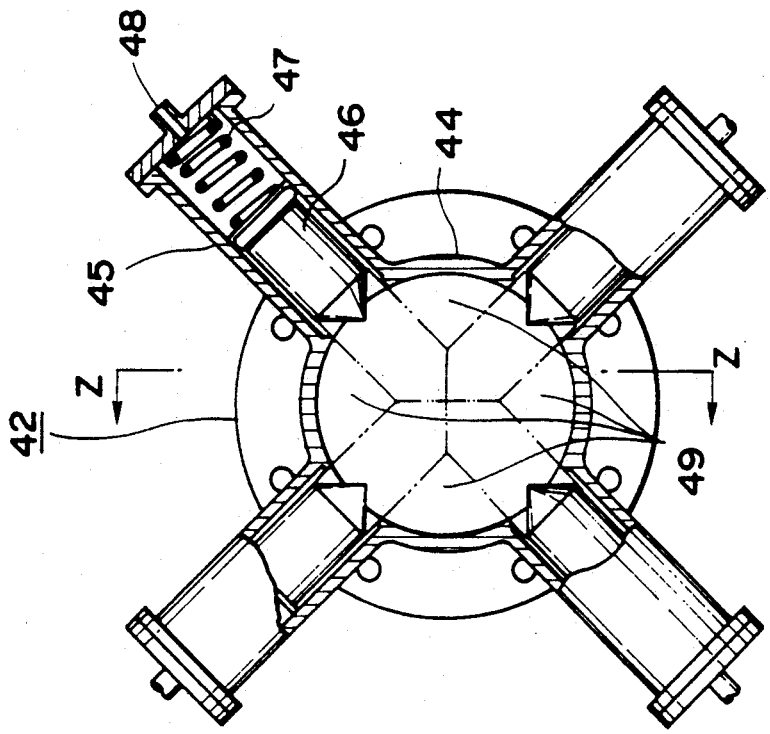
Figure 7A:
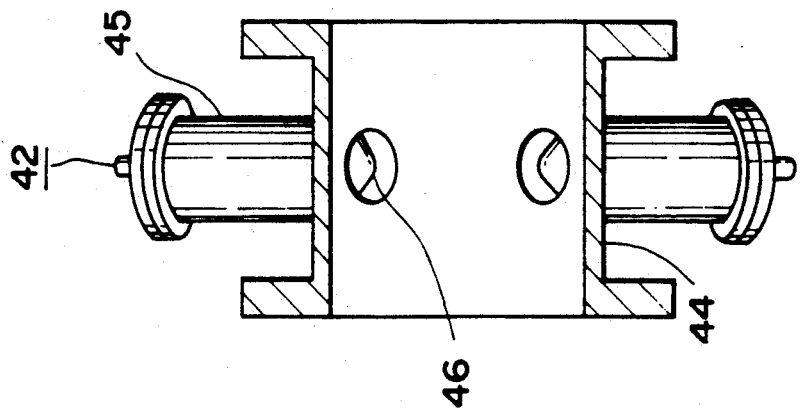

A sixth example of the flow rate measuring apparatus according to the first embodiment of the present invention will be described with reference to FIGS. 7A, 7B, 8A, and 8B. Referring to FIGS. 7A and 7B, a cleaning flow generator 42 comprises a cylindrical body 44 having mounting flanges at its both ends, four cylinders 45 arranged at the center in the axial direction of the body 44, and a piston 46 arranged in each cylinder. The axes of the cylinders 45 are located on a plane perpendicular to the axis of the cylinder at angular intervals of 90°. Each piston 46 is pulled in the corresponding cylinder 45 by a tension spring 47. A state in which the pistons 46 are pulled in the cylinders 45 corresponds to a normal state for performing flow rate measurement. In this state, the pistons 46 do not change the flow of a fluid in the body 44. Upon cleaning, pressurized air or the like is supplied in each cylinder 45 from a pressure inlet port 48 of the cylinder 45 to move the piston 46 forward to be set at a position indicated by an alternate long and two short dashed line in FIG. 7B. As a result, a flow path in the body 44 is narrowed to be four divided gaps 49 to increase the fluid flow speed, thereby removing an adhesive substance. Note that FIG. 7A is taken along a line Z—Z in FIG. 7B.

Figure 8B:
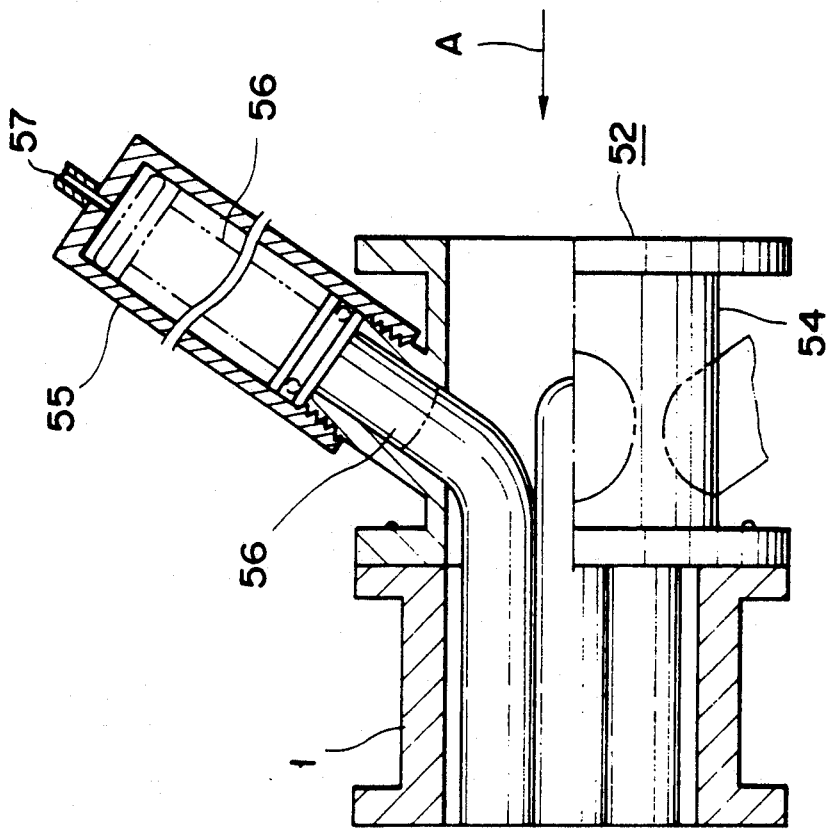
Figure 8A:
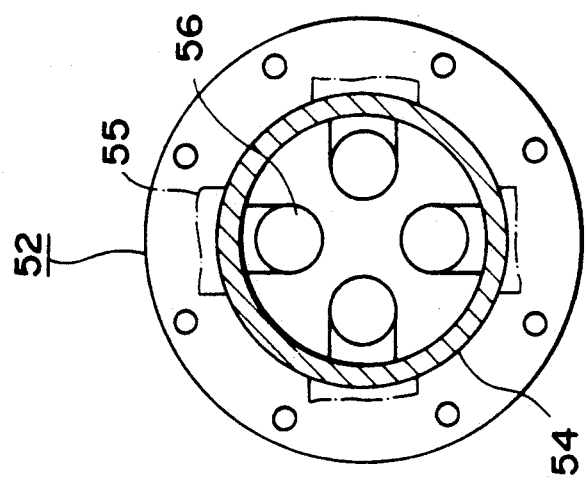

Referring to FIGS. 8A and 8B, a cleaning flow generator 52 comprises a flow control mechanism including a cylindrical body 54 having mounting flanges at its both ends, four cylinders 55 mounted on the body 54, and a flexible plunger 56 arranged in each cylinder 55. The cylinders 55 are mounted on the body 54 so as to be inclined toward the downstream side of a fluid to be measured and are arranged at angular intervals of 90°. Each flexible plunger 56 is obtained by reinforcing an elastic material such as rubber with fibers. The shape of the plunger 56 is a cylinder closed at its one end and open at its other end. The open end of the plunger 56 is fixed to a closed end of the cylinder 55 as indicated by an alternate long and two short dashed line. In order to perform flow rate measurement, each plunger 56 is kept at a position indicated by an alternate long and two short dashed line in FIG. 8B. For this reason, a fluid is not adversely affected by the plungers 56. In order to perform cleaning of the measuring pipe, pressurized air or the like is supplied in each cylinder 55 from a pressure inlet port 57. As a result, each plunger 56 extends into the measuring pipe of the flowmeter 1 as indicated by a solid line in FIG. 8B. For this reason, an effective sectional area of the measuring pipe is reduced to increase the speed of the fluid to be measured, thereby generating a cleaning flow. In addition, each plunger 56 vibrates and abuts against the measuring pipe to efficiently remove an adhesive substance. When the surface of each plunger 56 is formed to have a large number of small projections arranged like a brush, a cleaning effect can be further improved. When cleaning is finished, the air is exhausted from the pressure inlet port 57 to obtain negative pressure in the cylinder 55. As a result, the flexible plunger 56 is pulled in the cylinder 55 and returned to a flow rate measurement state.

Figure 9B:
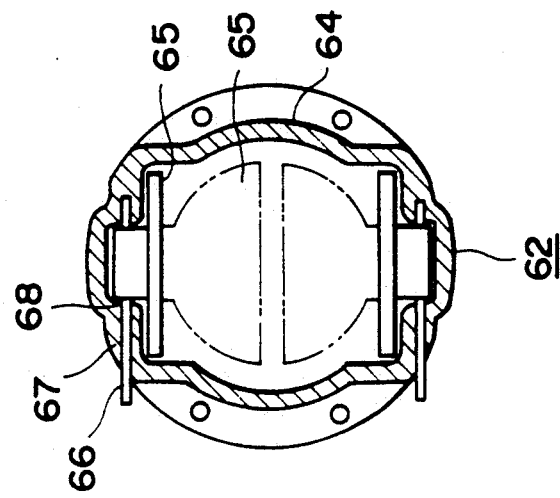
Figure 9A:
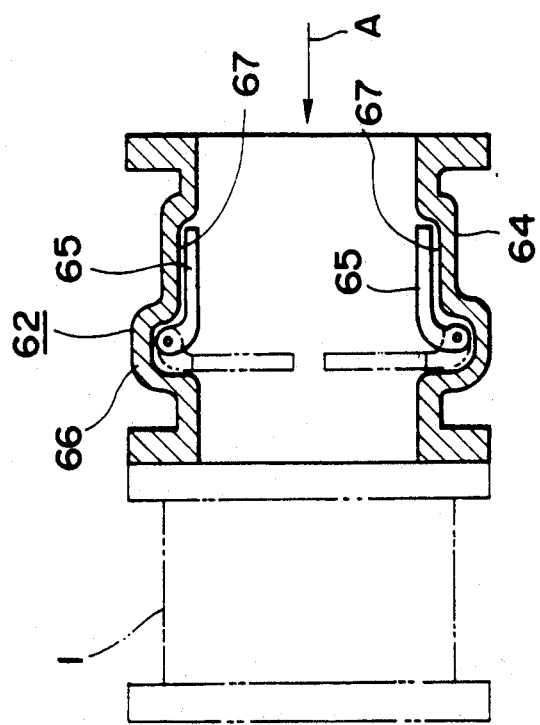

FIGS. 9A and 9B show a cleaning flow generator having the same effect as that of the cleaning flow generators shown in FIGS. 3 and 4. Referring to FIGS. 9A and 9B, a cleaning flow generator 62 comprises a flow control mechanism including a cylindrical body 64 having mounting flanges at its both ends, a pair of semicircular vanes 65, and a mechanism for rotating each vane 65 about its rotating shaft 66. The diameter of the vane 65 is set smaller than the inner diameter of the body 64. The inner surfaces at upper and lower side of the body 64 extend outward to form pockets 67 to house the vanes 65. A bearing portion 68 for supporting the rotating shaft 66 of each vane 65 is formed in the body 64. The vane 65 rotates about the shaft 66 and is displaced between a state perpendicular to the flow and a storage state parallel to the flow. The shaft 66 is driven by a driving mechanism (not shown). In the cleaning flow generator 62, in a normal state for performing flow rate measurement, the vanes 65 are kept housed in the pockets 67 as indicated by solid lines. In order to perform cleaning, the rotating shafts 66 are rotated to set the vanes 65 in the states perpendicular to the flow as indicated by alternate long and two short dashed lines. A sectional area of a flow path in the body 64 is reduced by the vanes 65 to increase the speed of a fluid flowing between the peripheral edge of each vane 65 and the inner wall surface of the body 64, thereby removing an adhesive substance.

The above cleaning operation may be executed by detecting an abnormality of an output signal from the flowmeter 1 and supplying a command from a sequencer to the cleaning flow generator 2. Alternatively, flow rate signals from the flowmeter 1 may be accumulated to execute the cleaning operation each time a predetermined number of flow rates are accumulated. In addition, the cleaning operation may be executed every predetermined time interval measured by a sequencer having a timer function. These methods can be arbitrarily selected in accordance with the type of fluid to be measured.

An inlet pipe having a valve may be connected to the upstream side of the flowmeter 1, e.g., to a connection portion between the cleaning flow generator 2 and the flowmeter 1, to the body of the generator 2, or to the pipe 3 on the upstream side of the generator 2. In this case, a cleaning assistant substance such as air, sand, or metal particle slurry may be supplied in a fluid through the inlet pipe. As a result, the cleaning efficiency is further improved.

2nd EMBODIMENT

Figures 10A, 10B:
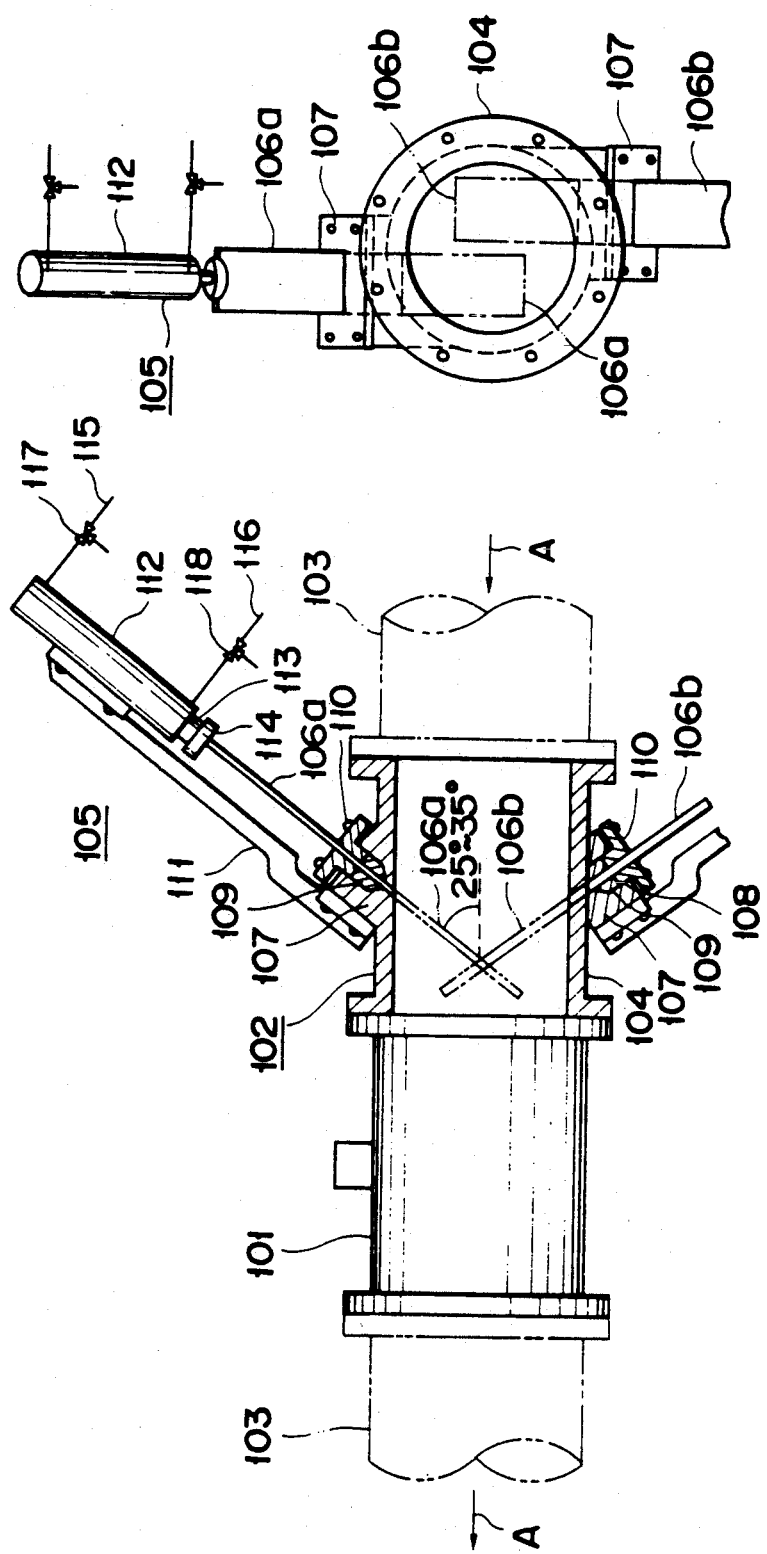
FIGS. 10A and 10B are views showing an arrangement of a flow rate measuring apparatus according to a second embodiment of the present invention.
Figure 16A:
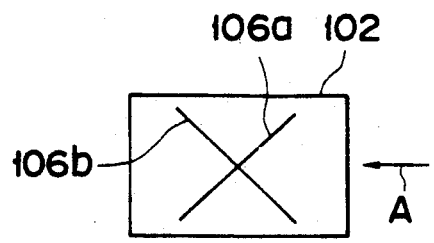
Figure 16B:
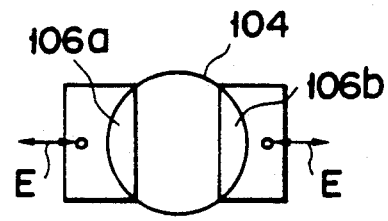

FIGS. 10A and 10B show a flow rate measuring apparatus according to a second embodiment of the present invention. Referring to FIG. 10A, a flowmeter 101 is connected to the upstream side of a pipe 103 in which a fluid to be measured flows in a direction indicated by an arrow A. A turning flow generator 102 is connected to the upstream side close to the flowmeter 101. The flowmeter 101 may be, for example, an electromagnetic flowmeter or an ultrasonic flowmeter. As shown in FIGS. 10A and 10B, the generator 102 comprises a flow control mechanism 105. The mechanism 105 includes a cylindrical body 104, plates 106a and 106b, and a driving mechanism for driving the plates 106a and 106b. As shown in FIG. 10A, the driving mechanism moves the plates 106a and 106b forward/backward while the plates 106a and 106b are inclined at an acute angle with respect to a flow direction of the fluid to be measured. As a result, the plates 106a and 106b are projected into or withdrawn from a flow path in a downstream direction. As shown in FIG. 10B, the driving mechanism moves the plates 106a and 106b to project into the fluid to be measured so as to be offset from the axis of the fluid. The plates may be projected in the flow path in an upstream direction.

An arrangement of the driving mechanism will be described in more detail below with reference to FIGS. 10A and 10B. Mounting seats 107 project from the outer surface of the body 104 at the upper and lower sides in the drawings so that their axes are inclined at an acute angle with respect to the fluid flow direction. The mounting seats 107 are offset from the center of the flow path. The mounting seats 107 have through holes having a rectangular sectional shape for receiving the plates 106a and 106b and recesses 108 for receiving packings 109 for surrounding the peripheries of the plates 106a and 106b. By tightening the packings 109 received in the recesses 108 by packing tightening tools 110, the plates 106a and 106b are movably sealed.

An arm 111 is mounted on one side surface of each mounting seat 107. A cylinder 112 is mounted on the distal end portion of each arm 111. One end of the plate 106a (106b) is connected to the distal end of a plunger 113 of each cylinder 112 via a tightening tool 114. Working pipes 115 and 116 are connected to the plunger 113. The pipes 115 and 116 have electromagnetic three-way valves 117 and 118, respectively.

In the flow rate measuring apparatus having the above arrangement, in a normal operation, a working fluid i supplied to each cylinder 112 via the valve 118 and discharged from the cylinder 112 via the valve 117, so that each plunger 113 is pulled in the corresponding cylinder 112. As a result, the plates 106a and 106b are kept away from the flow path. In this state, a fluid to be measured flowing in the flow path in the turning flow generator 102 is not adversely affected by the plates. Therefore, flow rate measurement can be continued by the flowmeter 101 with predetermined precision.

Figures 23, 24:
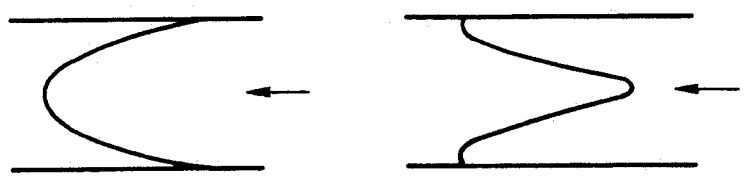

In order to clean the inner surface of the measuring pipe of the flowmeter, the working fluid is supplied in the cylinders 112 through the pipes 115 to push the plungers 113 forward so that the plates 106a and 106b project in the flow path. In this state, since a flow direction of the fluid to be measured is changed by the plates 106a and 106b located at asymmetrical positions about the fluid axis as shown in FIG. 10B, the fluid flows while turning. In the description, flat plates 106a and 106b are used, but curved plates may also be used. For example, when plates like portions 131 and 132 of a plate 130 as shown in FIG. 11 are placed in the flow path without changing their positional relationship, a turning flow can be generated. As shown in FIG. 24, the flow speed of this turning flow is low near the axis of the fluid and high near the wall of the measuring pipe. In a normal state, however, since the flow speed is decreased near the inner wall of the measuring pipe due to an adhesive substance, a speed distribution as shown in FIG. 23 is obtained. Therefore, upon cleaning, an adhesive substance on the inner wall of the measuring pipe of the flowmeter 101 is abraded by the fluid to be measured having a higher flow speed than that in the normal state. At the same time, the adhesive substance is subjected to a force in a shearing direction by a flow in a direction different from a normal flow direction and removed from the measuring pipe wall. Therefore, by continuously performing the cleaning operation for an arbitrary time period, an adhesive substance in the measuring pipe of the flowmeter 101 can be removed. After the cleaning operation, the plates 106a and 106b are withdrawn from the flow path and returned to the normal state.

In the embodiment shown in FIGS. 10A and 10B, although an angle of the plates 106a and 106b with respect to the fluid axis depends on the type of fluid, the fluid can turn most efficiently when the angle falls within the range of 25° to 35° with respect to the fluid axis.

According to the flow rate measuring apparatus of this embodiment, an adhesive in the measuring pipe can be removed by the fluid to be measured without removing pipes nor stopping the fluid. Therefore, a large-scale maintenance operation including operation stop of a plant required for preventing degradation in measurement precision or recovering degraded precision caused by an adhesive substance in the measuring pipe of the flowmeter need not be performed or need only be performed infrequently.

Directions and positions of the plates 106a and 106b are not limited to those in the embodiment shown in FIGS. 10A and 10B but can be variously modified. FIG. 12A shows a modification in which positions of plates 106a and 106b are offset in the axial direction of a fluid. FIG. 12B shows a modification in which plates 106a and 106b are shorter than those shown in FIGS. 10A and 10B. This modification can be suitably used when the flow speed of a fluid to be measured is high because vibrations of the plates can be prevented. A similar effect can also be realized by reducing the projecting length of the plates 106a and 106b into the fluid. FIG. 12C shows a modification in which only a single plate is located in a flow path. A similar arrangement can also be realized by pushing only one of the plates shown in FIGS. 10A and 10B. FIG. 13 shows a modification in which three plates are arranged at one side of a flow path. In this modification, plates 106a, 106b, and 106c are formed by cutting three portions A, B, and C from a plate as shown in FIG. 14. However, flat plates without twisting can be used. FIG. 15 shows a modification in which plates are inserted in a flow path from a plurality of portions (in this modification, three) along the circumferential direction of a cylindrical body 104. In this modification, a fluid to be measured having high viscosity can be effectively, reliably turned.

Figure 17A:
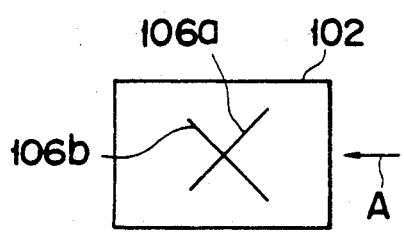
Figure 17B:
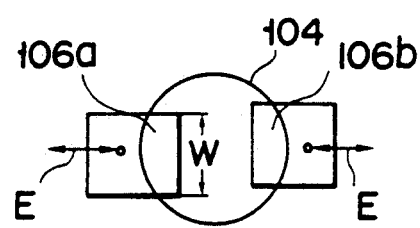

In modifications shown in FIGS. 16A and 16B, and 17A and 17B, an insertion/removal direction of a pair of plates 106a and 106b into a flow path is a direction E perpendicular to a flow direction of a fluid. In these modifications, forward/backward driving mechanisms for inserting/removing the plates into/from the fluid are arranged at both sides of a body 104. In such an arrangement, as compared with the arrangements shown in FIGS. 10A to 15 in which each plate is moved in its longitudinal direction, a cantilever length of the plate from its support point is shortened to advantageously suppress a vibration of the plate. FIGS. 17A and 17B show a modification in which a width W of the plates 106a and 106b is set narrower than that of the modification shown in FIGS. 16A and 16B. With this arrangement, the forward/backward driving mechanism can be made compact to reduce a cost. In the arrangement shown in FIGS. 17A and 17B, fluid to be measured can also be sufficiently turned except when a flow speed is low.

Figure 18A:
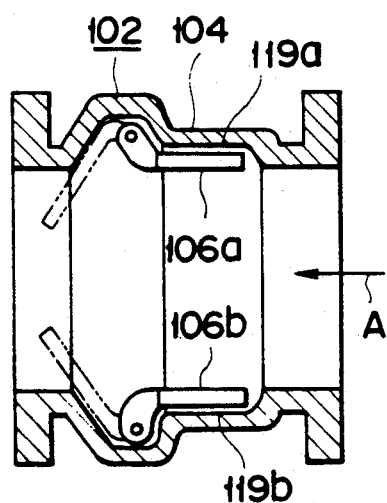
Figure 18B:
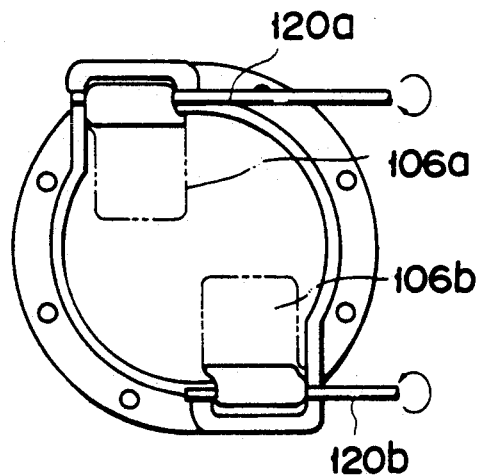

FIGS. 18A and 18B show a modification in which plates 106a and 106b are rotated about rotating shafts 120a and 120b, respectively, so as to be switched between a normal state indicated by solid lines and a cleaning state indicated by alternate long and two short dashed lines. In this modification, as shown in a sectional view of FIG. 18A, recesses 119a and 119b are formed in a body 104 to house the plates 106a and 106b therein in the non-cleaning state. In this modification, an external arrangement of the body 104 can be made compact. In addition, as compared with the arrangement in which sealing is performed between the movable plate and the body 104, sealing need only be performed between the rotating shafts 120a and 120b and the body 104, resulting in simple sealing.

FIGS. 19A, 19B, and 19C show a turning flow generator capable of switching plates for changing a direction of a flow between a normal state parallel to the flow and a cleaning state inclined with respect to the flow. Each of plates 121a and 121b for changing the flow direction has a semi-circular shape obtained by, e.g., dividing a butterfly valve into two parts as shown in FIG. 19C and has a thickness-direction shape as shown in FIG. 19A. The plates 121a and 121b can rotate through a predetermined angle in opposite directions about vertical rotating shafts 122a and 122b. In the normal state (i.e., upon flow rate measurement), the plates 121a and 121b are set parallel to the flow direction of a fluid as shown in FIG. 19A. In the cleaning state, as shown in FIG. 19B, the plates 121a and 121b are twisted in opposite directions so as to be inclined through a predetermined angle with respect to the flow direction of the fluid, thereby generating a turning flow This modification also has an advantage of easy sealing of the rotating shafts.

FIGS. 20A and 20B show a modification of the turning flow generator shown in FIGS. 19A and 19B. In FIGS. 20A and 20B, rotating shafts 124a and 124b of a pair of rectangular plates 123a and 123b, respectively, are arranged not concentrically but offset from each other. The plates 123a and 123b extend to be inclined in a downstream direction of a fluid to be measured at an acute angle with respect to a flow direction of the fluid. In a flow rate measurement state, as shown in FIG. 20A, the plates 123a and 123b are set parallel to the flow direction of the fluid to be measured. In a cleaning state, as shown in FIG. 20B, the plates 123a and 123b are inclined at a predetermined angle with respect to the flow direction of the fluid to be measured.

Figure 21:
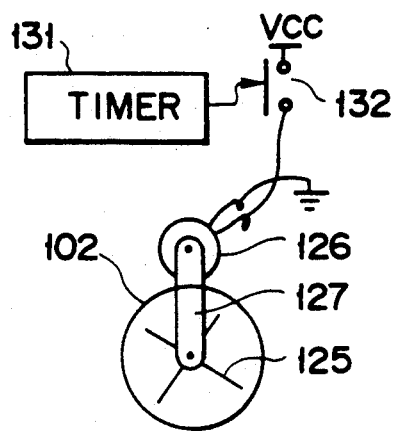

FIG. 21 shows a modification of the turning flow generator comprising a flow control mechanism for externally applying a driving force to rotate a fluid to be measured. In this modification, a rotor 125 having a plurality of (e.g., four) plates radially fixed to a rotating shaft is arranged in a fluid path so as to be supported concentrically with the central axis of a body 104. The rotor 125 is rotated by a force motor 126 arranged outside the body 104 via a transmission mechanism (e.g., a gear train) 127. Upon rotation of the rotor 125, the fluid to be measured is turned. When the rotor 125 is stopped, the plates constituting the rotor 125 have almost no adverse effect on flow rate measurement. In this turning flow generator, even when a length of each plate of the rotor 125 in a fluid axis direction is shortened, a turning flow generation efficiency can be increased. Note that the motor 126 can be arranged in a support member for supporting the rotating shaft of the rotor 125. A timer 131 and a relay 132 shown in FIG. 21 will be described later.

In the modification shown in FIG. 21, the rotor 125 is constituted by four plates. However, it is possible to form the rotor by a single plate or two pates arranged in a flat plane. With this structure the rotor can be taken out of the pipe, while the plate is kept in parallel to the transmission mechanism 127. If the plate is distorted, like a vane of a screw propeller, the fluid to be measured can be swirled, and the flow speed of the fluid can be controlled Therefore, an adhesive substance can be clearly removed, even when the fluid to be measured is static or the flow of the fluid is very slow.

Figure 22:
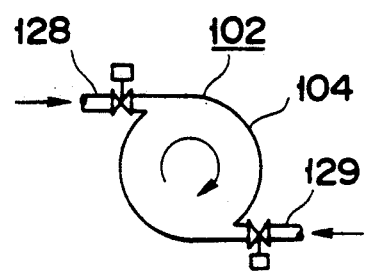

A rotating flow generator shown in FIG. 22 comprises a flow control mechanism in which branch pipes 128 and 129 are connected to upper and lower portions of a cylindrical body 104. The branch pipes 128 and 129 extend in, e.g., a tangential direction to the outer surface of the body 104. A fluid to be measured is turned by injecting an additional fluid from the branch pipes 128 and 129 into the body 104 at high speed. Upon cleaning, the additional fluid is injected from the branch pipes 128 and 129 into the body 102. In a normal operation, injection of the additional fluid is stopped to perform flow rate measurement. A part of the fluid to be measured or air can be used as the additional fluid. In addition, sand, metal grains, or the like may be added to the additional fluid to increase a cleaning effect.

In a flow rate measuring apparatus in which any of the above various types of rotating flow generators is arranged at the upstream side of a flowmeter, cleaning of a measuring pipe of the flowmeter and removal of an adhesive substance can be easily performed at an arbitrary timing by using a fluid to be measured while the fluid is kept flowed. This is very effective in continuously performing flow rate measurement of sewage, human waste, sludge, an organic drainage, or the like without an influence of an adhesive substance on a measuring pipe of a flowmeter. That is, as has been described in the item of Prior Art, an adhesive substance in a measuring pipe produced due to a sewage or the like is decomposed and changed into carbon or an iron-based inorganic compound by bacteria, molds, or the like and then into a hard cement-like substance by $SiO_2$, $Ca(OH)_2$, or the like mixed in a fluid. This hard substance is so strong as not to be easily removed by cleaning. In the flow rate measuring apparatus of this embodiment, however, by performing cleaning once a week, once to several times a month, or once in several months {a cleaning frequency significantly differs depending on a season (the frequency is increased in summer because a water temperature is high and decreased in winter) and the type of a fluid}, an adhesive substance can be easily removed before it is hardened.

This cleaning can be set by programs or the like so as to be automatically performed. A flow rate measuring apparatus for performing cleaning every predetermined period will be described below with reference to FIG. 21. The timer 131 shown in FIG. 21 measures a time and applies a voltage of ON level to the control terminal of the relay 132 for a predetermined period (e.g., 59 minutes) each time a predetermined period (e.g., a week) has elapsed. When the ON-level voltage is applied to the control terminal, the relay 132 is turned on to supply power to the motor 126, thereby executing a cleaning operation.

During cleaning, the flow rate measuring apparatus holds an indication value obtained immediately before cleaning and outputs this held value as a pseudo signal. Alternatively, information representing that cleaning is being performed may be recorded.

As has been described above, according to this embodiment, there is provided a flow rate measuring apparatus comprising the flowmeter 101 connected to a pipe in which a fluid to be measured flows and the turning flow generator which can be switched between a normal state in which a flow of the fluid is almost not changed and a cleaning state in which the fluid to be measured is turned to increase a flow speed near a wall of a measuring pipe of the flowmeter. As a result, the turning flow generator is set in the normal state to measure a flow rate with high accuracy. When the turning flow generator is switched to the cleaning state, a flow speed of the fluid to be measured near the measuring pipe wall of the flowmeter can be increased higher than that at a pipe axis portion. As a result, a flow in a direction different from a flow direction in the normal state is generated to peel and remove an adhesive substance.

3rd EMBODIMENT

A third embodiment of the present invention will be described with reference to FIG. 25. A flow rate measuring apparatus of this embodiment is suitable for a pipe in which a fluid having a large head flows and a flow rate is not much changed when an object for causing a pressure loss is placed in the pipe. A flowmeter 201 is a flowmeter not having an obstructive element in its measuring pipe 201a, e.g., an electromagnetic flowmeter, an ultrasonic flowmeter, or a correlation flowmeter. A short pipe 202 on which a balloon inserting/extracting unit 203 is mounted is connected to the upstream side of the flowmeter 201. Pipes 220 are connected to the downstream and upstream sides of the flowmeter 201 and the short pipe 202, respectively. The balloon inserting/extracting unit 203 comprises a case 204, a power reel 205, a supply/exhaust pipe 206, power rollers 207, and a motor. The supply/exhaust pipe 206 is connected to the end of a balloon 208 wound around the power reel 205 and a supply/exhaust unit 206a. The supply/exhaust unit 206a performs supply/exhaustion of fluid (gas (for example, air, $N_2$) and liquid (for example, water, oil)) into/from the balloon 208. In the following description, assume that the fluid is air. The power rollers 207 are arranged near an inlet/outlet port of the case 204. The balloon 208 comprises, e.g., a rubber tube 208a having an elliptical sectional shape and round strings 208b fixed on the inner surface of the rubber tube 208a, as shown in FIG. 26. The round strings 208b are arranged on the inner surface of the rubber tube 208a at equal intervals in the longitudinal direction of the balloon 208. The strings 208b are fixed on the inner surface of the tube 208a by, e.g., rubber. The strings 208b prevent the tube 208a from being pressed and flattened upon exhaustion of air from the balloon 208, thereby facilitating air exhaustion. Therefore, in this embodiment, air can be easily exhausted from a portion of the balloon 208 wound around the power reel 205. A portion except for a portion to be inflated of the balloon 208 may have a structure in which an air passage consisting of a plurality of small holes 208d is formed in a rubber belt 208c, as shown in FIG. 27. As shown in FIG. 25, a disk-like stopper 209, for example, is formed at the distal end of the balloon 208. When the balloon 208 is wound around the power reel 205, the stopper 209 is fitted in a circular recess 210 formed at the inlet/outlet port of the case 204 to serve as both a stopper and a cover for sealing the short pipe 202.

In the flow rate measuring apparatus having the above arrangement, in a normal operation, the balloon 208, from which air is exhausted, is wound around the power reel 205 and housed in the case 204, as indicated by a solid line in FIG. 25. The stopper 209 is fitted in the recess 210 to serve as a cover. In this state, the measuring pipe 201a does not differ from other pipes, i.e., a flow rate in the pipe 201a is measured with predetermined precision.

In order to remove an adhesive substance on the inner surface of the measuring pipe 201a of the flowmeter 201, while a fluid to be measured is flowed, the motor is rotated to drive the power reel 205 and the power rollers 207 in a feed direction. The balloon 208 is gradually fed in the flow path and flowed in the measuring pipe 201a of the flowmeter 201 by a flow of the fluid. When the distal end of the balloon 208 reaches the end at the downstream side of the measuring pipe 201a, feeding of the balloon 208 is stopped, and air is supplied from the supply/exhaust unit 206a into the balloon 208 via the supply/exhaust pipe 206. By adjusting an air supply amount, the balloon 208 is inflated so that a predetermined gap is defined between the balloon 208 and the inner surface of the measuring pipe 201a as indicated by an alternate long and two short dashed line in FIG. 25. The air supply amount is determined by calculations in relation to a pressure of the fluid and by confirming the calculation result by experiments.

When the balloon 208 is inflated, an effective sectional area of the measuring pipe 201a is reduced to increase a speed of a fluid flowing along the inner surface of the measuring pipe 201a. An adhesive substance is gradually peeled and flowed from the pipe wall by the fluid at high speed. The adhesive substance is removed by continuously performing this cleaning step for a predetermined time period calculated by experiments.

After cleaning, air is exhausted from the balloon 208 through the supply/exhaust pipe 206 to deflate the balloon 208. The air in the balloon 208 is exhausted by using a vacuum pump, an aspirator, or the like in the air supply/exhaust unit 206a so that the balloon 208 is easily wound. Thereafter, the power reel 205 and the power rollers 207 are driven to extract the balloon 208 from the flow path and wind the balloon 208 around the power reel 205. When the stopper 209 is fitted in the circular recess 210, winding is stopped to house the balloon 208 as indicated by a solid line in FIG. 25, thereby completing the cleaning step. Thereafter, flow rate measurement in a normal operation is restarted and continued.

As described above, in the flow rate measuring apparatus of the third embodiment, by only activating the balloon inserting/extracting unit 203, the balloon 208 is inflated, the flow speed of the fluid to be measured is increased, and an adhesive substance is peeled and removed. In this case, the pipe need not be removed, and the fluid to be measured can be kept flowed. Therefore, an adhesive substance in the measuring pipe can be easily removed, i.e., an adhesive substance on the overall inner surface of the measuring pipe 201a can be removed. After cleaning, the balloon 208 is extracted from the measuring pipe 201a and housed in the balloon inserting/extracting unit 203. Therefore, flow rate measurement is not adversely affected.

Figures 28A, 28B:
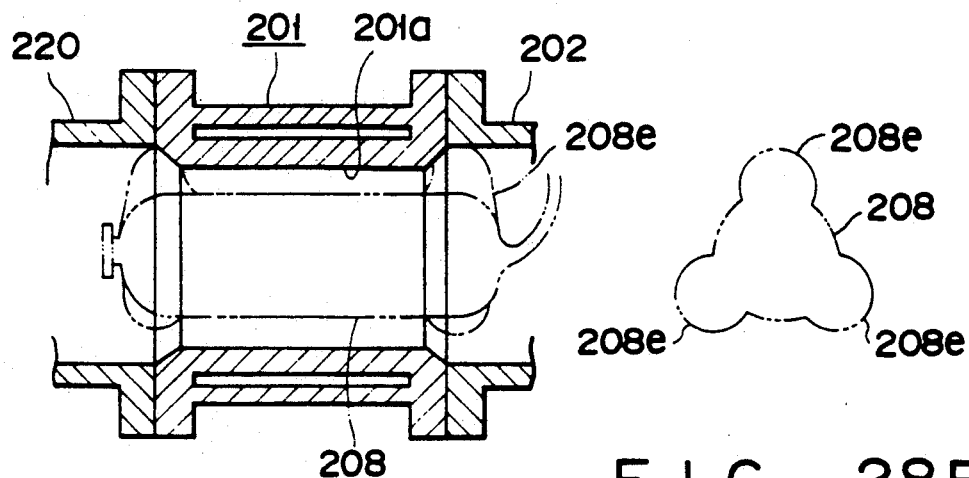

FIGS. 28A and 28B show a modification of the flow rate measuring apparatus shown in FIG. 25. In FIG. 28A, an inner diameter of a pipe 220 connected to the downstream side of a short pipe 202 and a flowmeter 201 is formed to be slightly larger than that of a measuring pipe 201a by, e.g., 20%. In addition, as shown in FIG. 28B, three local projecting portions 208e are formed at both end portions of a portion to be inflated of a balloon 208 so as to be inflated at equal intervals in the circumferential direction. With this arrangement, when the balloon 208 is inflated, the projecting portions 208e abut against the inner surfaces of the short pipe 202 and the pipe 220 to fix the balloon 208, thereby preventing an offset or shake of the balloon 308 in the measuring pipe 201a.

Figure 29:
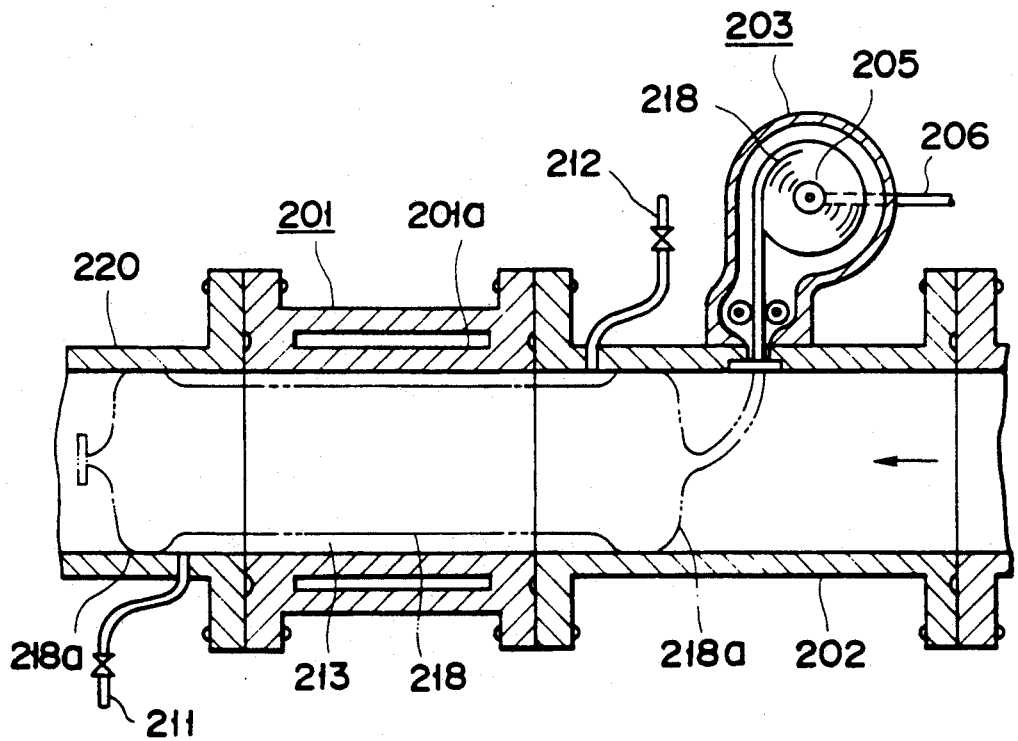

FIG. 29 shows another modification of the flow rate measuring apparatus according to the second embodiment. The flow rate measuring apparatus shown in FIG. 29 is suitable for a pipe in which a fluid having a small head flows and a flow is stopped when an object for causing a pressure loss is placed in the pipe. As shown in FIG. 29, a cleaning agent supply/discharge pipe 211 is connected to a lower portion near a connection flange of a pipe 220 connected to the downstream side of a flowmeter 201, and a cleaning agent supply/discharge pipe 212 is connected to an upper portion near a connection flange of a short pipe 202. The length of a portion to be inflated of a balloon 218 is increased from opening positions of the pipes 211 and 212 to the downstream and upstream sides by predetermined amounts. The diameters of both end portions 218a of the portion to be inflated of the balloon 218 are formed larger than that of the other portion so that the both end portions 218a abut against a pipe wall when the balloon 218 is inflated. A balloon inserting/extracting unit 203 for inserting/extracting the balloon 218 has the same arrangement as shown in FIG. 25 and is mounted on the short pipe 202.

In the flow rate measuring apparatus having the above arrangement, upon normal flow rate measurement, the balloon 218 is housed in the balloon inserting/extracting unit 203. In order to clean the inner surface of the measuring pipe 201a, the unit 203 is activated to insert the balloon 218 into the measuring pipe 201a and air is supplied therethrough to inflate the balloon 218. The balloon 218 is inflated as indicated by an alternate long and two short dashed line in FIG. 29, and the large-diameter portions 218a abut against the pipe wall, thereby closing the short pipe 202 at the upstream side of the opening of the cleaning agent supply/discharge pipe 212 and closing the pipe 220 at the downstream side of the opening of the cleaning agent supply/discharge pipe 211. As a result, a gap 213 between the inner surface of the measuring pipe 201a and the outer surface of the balloon 218 is closed to stop a flow having a small head in the pipe. In this state, an agent for removing an adhesive substance is flowed from the cleaning agent supply/discharge pipe 211 and discharged from the cleaning agent supply/discharge pipe 212. At this time, an adhesive substance on the pipe wall is removed by an effect of the agent. Examples of the agent are an aqueous solution of hydrochloric acid, nitric acid, or the like for dissolving the adhesive substance, an aqueous solution of caustic soda for cleaning the adhesive substance, a soapless soap, a slurry of an abrasive agent, and steam for dissolving adhered oils and fats.

After the balloon 218 is inflated, an operation may be performed such that (1) a valve of the cleaning agent supply/discharge pipe 211 is opened to supply air from the cleaning agent supply/discharge pipe 212, (2) water is flowed to wash the gap 213, (3) air is supplied again to empty the gap 213, and (4) the agent is supplied from the cleaning agent supply pipe 211 in the gap 213, thereby dissolving the adhesive substance. In this case, by recovering the used agent from the pipe 212, the agent can be used several times.

The following effects can be obtained by this cleaning. [a] Since a volume of the gap 213 is small, the overall inner surface of the measuring pipe 201a can be cleaned by a small amount of the agent. [b] Since the agent does not flow into the pipe, an environmental pollution is not caused by the agent. [c] The agent used in cleaning can be recovered and used a plurality of times to lead to an economical advantage.

After the cleaning step is finished, the balloon inserting/extracting unit 203 is activated to house the balloon 218 in the unit 203, and normal flow rate measurement is restarted.

In the modification shown in FIG. 29, the gap 213 closed by the balloon 218 is formed. However, a gap formation method is not limited to that of this modification. For example, an arrangement as shown in FIG. 30 may be adopted. Referring to FIG. 30, a plastic or metal pipe 218' is slidably inserted in a measuring pipe 201a. The pipe 218' has an outer diameter capable of forming a gap between the pipe 218' and the inner surface of the measuring pipe 201a and a length longer than that of the measuring pipe 201a. Flanges formed at both the end portions of the metal pipe 208' abut against the inner pipe wall via packings. With the arrangement shown in FIG. 30, the measuring pipe can also be cleaned as in the arrangement shown in FIG. 29. After cleaning, the pipe 208' is moved in the pipe 220 at the upstream or downstream side of the measuring pipe 201a by a screw feeding mechanism or the iike. Note that in the modifications shown in FIGS. 28 and 29, mounting positions of the cleaning agent supply/discharge pipes are not limited to those described above but can be any places as long as a cleaning agent is sufficiently supplied and discharged.

In the above examples, the cleaning agent was injected into the closed space. However, the present invention is not limited to this embodiment. For example, it is possible to inject gas (e.g., air) from the pipe 212 and extract the mixture of the gas and fluid from the pipe 211. In this case, it is more desirable that the injected gas be caused to bubble. The material to be injected is not restricted to gas, and a mixture of gas and liquid can be used.

If the pipes 211 and 212 are arranged, for example, as shown in FIG. 22, the mixture of gas and liquid rotates within the closed space, and the adhesive substance can be effectively removed.

A modification of the flow rate measuring apparatus shown in FIG. 25 will be described below with reference to FIG. 31. Similar to the embodiment shown in FIG. 25, the flow rate measuring apparatus of this modification is suitable for a pipe in which a fluid having a large head flows. In this modification, an outer diameter of a balloon 228 to be inflated in a measuring pipe 201a of a flowmeter 201 is relatively small. A plurality of, e.g., three or four balloons 228 are arranged about the axis of the measuring pipe 201a. Although not shown, a balloon inserting/extracting unit is mounted on a short pipe 202 for each balloon 228.

In the flow rate measuring apparatus shown in FIG. 31, a flow path in the measuring pipe 201a is narrowed by inflating the plurality of balloons 228. As a result, a speed of a fluid flowing along the inner surface of the measuring pipe 201a is increased to peel and remove an adhesive substance.

In the apparatuses shown in FIGS. 25 and 31, small projections 229 may be formed on the surfaces of the balloons 208 and 228 as indicated by broken lines in FIG. 31. In this case, when the balloons are shaken by a flow of the fluid, the small projections 229 abrade an adhesive substance on the inner surface of the measuring pipe 201a, thereby improving an adhesive substance removing function.

As has been described above, according to this embodiment, the balloon inserting/extracting unit is located near the upstream side of the flowmeter not having an obstructive element in the measuring pipe. This balloon inserting/extracting unit inserts a deflated balloon in the measuring pipe of the flowmeter so as to extend in the pipe axial direction, and exhausts air from the balloon to deflate it and extract it from the measuring pipe. When the balloon is inflated, an effective sectional area of the measuring pipe is decreased to increase a flow speed of a fluid, and an adhesive substance on the inner surface of the measuring pipe is removed by the fluid. Such an arrangement is suitable for a flow rate measuring apparatus for a high-head fluid pipe. An arrangement may be made such that (1) a cleaning agent supply/discharge pipe open at both the end portions or portions at the upstream and downstream sides near the end portions of the measuring pipe is formed, (2) a balloon, portions of which located at the upstream and downstream sides from the opening portions of the cleaning agent supply/discharge pipe abut against a pipe wall and close a flow path when the balloon is inflated, is used, and (3) a cleaning agent is supplied in a closed gap defined between the inflated balloon and the inner surface of the measuring pipe. This arrangement is suitable for a flow rate measuring apparatus for a low-head fluid pipe. According to this embodiment, an adhesive substance problematic in flow rate measurement of various fluids which tend to produce an adhesive substance can be removed from the entire inner surface of the measuring pipe by a simple operation without removing the pipe. Therefore, as compared with a conventional method in which a pipe is removed to perform removal of an adhesive substance, a maintenance load can be largely reduced to assure flow rate measurement precision and improve reliability of a measurement value. In the case of the flow rate measuring apparatus having the structure shown in FIGS. 25, 28A, 29 and 31, wherein the fluid flowing in the forward direction and in the reverse direction can be measured, there is no problem if the pipe is cleaned while the fluid flows in the above direction. The direction of flow of the fluid can be judged according to the negative/positive level of the output signal of the flow rate measuring apparatus. Based on this judgement, the cleaning of the pipe can be automatically performed.

4th EMBODIMENT

Figure 32:
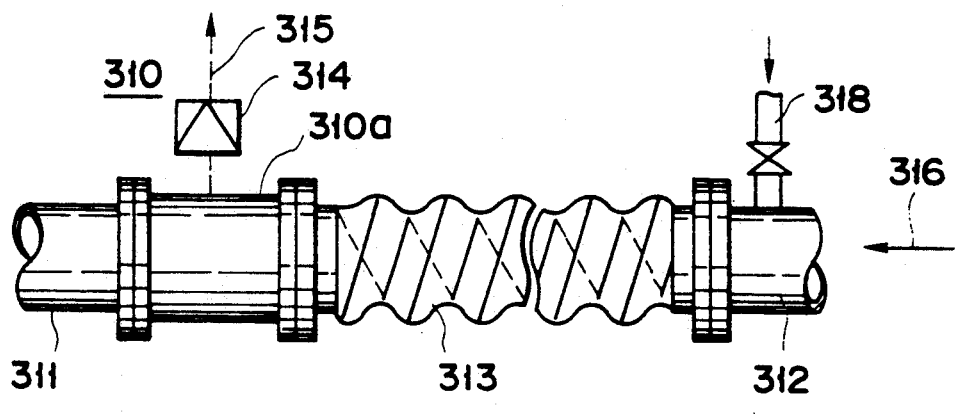
FIG. 32 is a view showing an arrangement of a flow rate measuring apparatus according to a fourth embodiment of the present invention.

A flow rate measuring apparatus comprising a cleaning unit according to a fourth embodiment of the present invention will be described below with reference to FIG. 32. Referring to FIG. 32, a turning flow generator is connected to the upstream side of a measuring pipe 310a of a flowmeter 310. The turning flow generator comprises a spiral pipe 313. A pipe 312 is connected to the upstream side of the spiral pipe 313. A pipe 311 is connected to the downstream side of the measuring pipe 310a. A solid substance particle inlet port 318 for mixing a solid substance into a fluid to be measured 316 is formed in the pipe 312 at the upstream side. A signal from a electrode for induced electromotive force detection mounted on the measuring pipe 310a is output via an amplifier 314.

Figure 33:
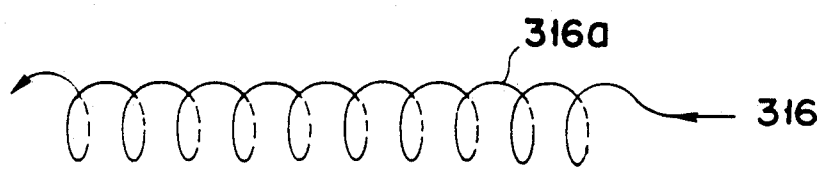
FIGS. 33, 34, and 35 are views for explaining an operation of a turning flow generator shown in FIG. 32.

When the fluid to be measured 316 flows into the spiral pipe 313, it turns in accordance with the shape of the spiral pipe 313 as shown in FIG. 33. For this reason, since a solid substance having a large specific gravity flows along the pipe wall, the inner surface of the measuring pipe of the flowmeter is abraded as if it is sandpapered. As a result, the inner surface of the measuring pipe 310a is always kept clean.

Figure 34:
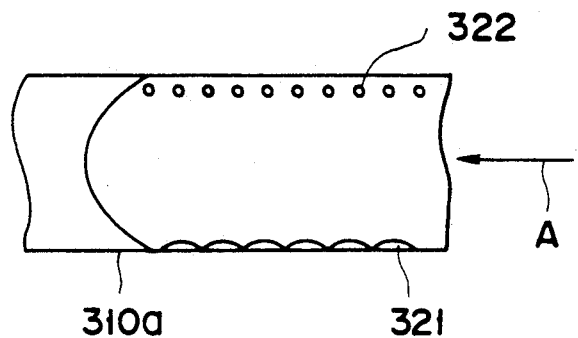
Figure 35:
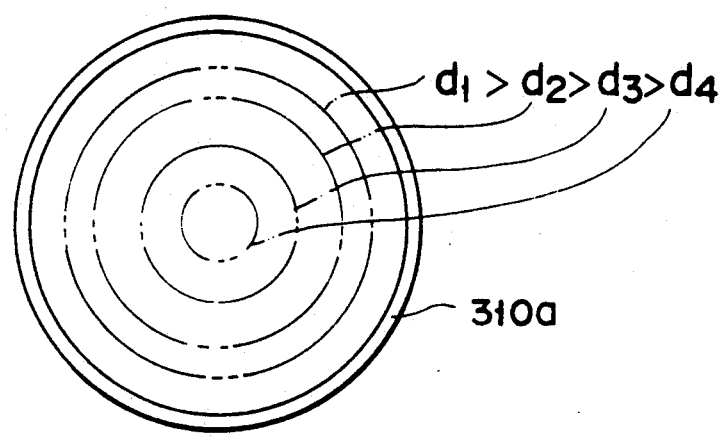

As shown in FIG. 34, a sewage contains a precipitated solid substance 321 and a small amount of a floating substance (including bubbles) 322. As is apparent from a fluid line shown in FIG. 34, the fluid becomes an asymmetric fluid because a speed of the fluid is partially increased or decreased at its upper and lower portions. For this reason, an error is included in a measurement value in an electromagnetic flowmeter of a uniform magnetic field type (an influence is relatively small in an electromagnetic flowmeter of a functional magnetic field distribution (FF) type). In this embodiment, however, the fluid to be measured is always turned. As shown in FIG. 35, when the fluid to be measured is turned, substances having the same specific gravity d are concentrically distributed. For this reason, a flow rate can be measured with high precision by even the electromagnetic flowmeter of a uniform magnetic field type. Upon flow of the turning fluid, a substance having a large specific gravity cleans a (liquid contacting) lining of the electromagnetic flowmeter and always cleans the electrode surface, thereby maintaining a good state for extracting signals. Since oxygen in a bubble which is brought into contact with the electrode surface to form a surface cell has a specific gravity significantly smaller than that of a fluid occupying most of the fluid to be measured, oxygen is concentrated and flowed along the fluid axis, i.e., a central portion of the electromagnetic flowmeter. For this reason, oxygen is not brought into contact with the electrode, thereby suppressing generation of slurry noise (1/f noise) and enabling stable measurement. Slurry noise is generated when the electrode surface is brought into contact with the flowing fluid and a DC level of the generated electrochemical noise (DC) is varied and mixed in a signal as noise. When oxygen is brought into contact with the electrode surface, the noise level is also large.

In the case of an ultrasonic flowmeter, an adhesive substance (containing an organic substance) in a pipe ferments and changes into a bread-like adhesive substance by carbonic acid gas ($CO_2$) generated upon fermentation, thereby interfering with transmission of an ultrasonic wave required for measurement. When a fluid to be measured is turned, generation of a bread-like adhesive substance can be prevented by a strong cleaning effect.

Figure 36:
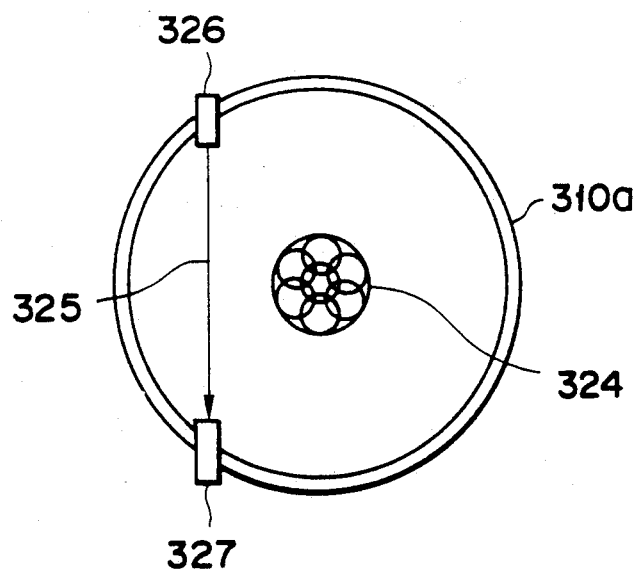

When the fluid to be measured is not turned, bubbles are dispersed in a fluid path. When the fluid to be measured 316 is constantly turned, however, bubbles 324 are concentrated at the pipe axis as shown in FIG. 36. Therefore, as shown in FIG. 36, an ultrasonic transmitting and receiving elements 327 must be arranged in the measuring pipe 310a so that an ultrasonic wave path 325 is kept away from the bubbles 324. When the ultrasonic transmitting and receiving elements 326 and 327 are arranged in the measuring pipe 310 as shown in FIG. 36, an ultrasonic wave is transmitted well in the fluid to be measured. In a conventional system, an ultrasonic flowmeter is not suitable for measurement of a sewage flow rate. By constantly turning the fluid to be measured, however, even an ultrasonic flowmeter can be used in measurement of a sewage flow rate. When a flow speed of the fluid to be measured is low, concentrated bubbles tend to float and be flowed by the turning flow as shown in FIGS. 37A, 37B, 37C, and 37D. In this case, however, by mounting the ultrasonic transmitting and receiving elements 326 and 327 on the measuring pipe 310 so that a wave path is kept away from the pipe axis, the wave path can be kept away from the bubbles 324 as shown in FIGS. 37A, 37B, 37C, and 37D.

The ultrasonic transmission/reception elements 326 and 327 have functions of transmission and reception of ultrasonic wave. One of the elements 326 and 327 serves as a transmitter, and the other as a receiver. The ultrasonic transmission/reception elements 326 and 327 are switched so as to alternately serve as a transmitter and a receiver, whereby the occurrence of error can be prevented.

Speeds at the peak and valley of a flow speed of the turning flow 316 significantly differ from each other. In addition, the peak and valley positions of the flow speed vary over time or in accordance with the flow speed. For this reason, an ultrasonic flowmeter sometimes cannot correctly measure a flow rate. FIG. 38 shows an ultrasonic flowmeter capable of reducing an influence caused by such a flow rate variation. Referring to FIG. 38, a plurality of pairs (in FIG. 38, three pairs) of ultrasonic transmitting and receiving elements 326a, 326b, 326c, 327a, 327b, and 327c are arranged on a measuring pipe 310. Outputs from the pairs of the transmitting and receiving elements 326a, 326b, 326c, 327a, 327b, and 327c are supplied to and converted into signals corresponding to flow rates by flow rate converters 331a, 331b, and 331c, respectively. Output signals from the converters 331a, 331b, and 331c are supplied to and averaged by an averaging circuit 333. In FIG. 38, flow rate signals obtained in correspondence with the peak and valley of the flow speed are averaged by the averaging circuit 333 and output. Therefore, the peak and valley portions of the flow speed are averaged to prevent a variation, an error, or the like of an indication value caused by a change in peak or valley position of the flow speed or the like.

As described above, in the case of an electromagnetic flowmeter, a flow speed can be correctly measured by constantly turning a fluid to be measured. In the case of an ultrasonic flowmeter, a flow rate can be relatively correctly measured by averaging the peak and valley of a flow speed. When a drift component is present in a turning flow, however, an indication value of a flowmeter sometimes offsets from an actual flow rate. In addition, in a flowmeter of another type, an indication value sometimes offsets from an actual flow rate due to a turning flow. In this case, an output from the flowmeter is calibrated (corrected) to coincide with the actual flow rate. FIG. 39 shows a flowmeter comprising a calibrating unit for calibrating an output value from the flowmeter to coincide with an actual flow rate. An arrangement shown in FIG. 39 is the same as that shown in FIG. 32 except that a controller 340 for adjusting a amplification factor of an amplifier 314 is added.

Calibration of an output value from the flowmeter is performed a follows. That is, before normal flow rate measurement is performed, a flow rate measuring apparatus comprising a flowmeter 310 and a turning flow generator 313 shown in FIG. 39 is connected to an experimental pipe system. At this time, a calibrating flowmeter is arranged on the upstream side of a spiral pipe 313. While the calibrating flowmeter measures a flow rate of a non-turning fluid to be measured, the flowmeter 310 to be calibrated measures a flow rate of a turning flow. The controller 340 adjusts the amplification factor of the amplifier 314 so that an output 315 from the amplifier 314 coincides with an indication value of the calibrating flowmeter. After adjustment, the flow rate measuring apparatus is connected to a pipe system to be actually used. Note that the controller 340 may be removed after calibration.

Figure 40:
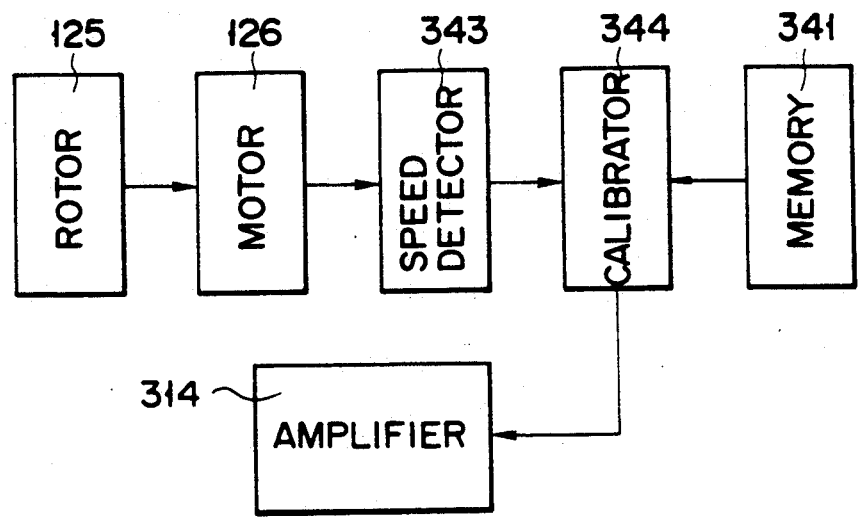

In addition, in the arrangement in which a turning speed of a fluid to be measured can be changed by adjusting a rotational speed of the rotor 125 as shown in FIG. 21, the amplification factor of the amplifier 314 may be changed in accordance with the speed of the rotor 125. Such an arrangement will be described below with reference to FIG. 40. A relationship between the rotational speed of the rotor 125 and the amplification factor of the amplifier 314 is obtained by experiments and stored in the form of a table or relation in a memory 341 such as an EEPROM. A speed detector 343 including a rotary encoder or the like is connected to a motor 126. The speed detector 343 obtains the rotational speed of the rotor 125 on the basis of the rotational speed of the motor 126 and outputs a corresponding signal. On the basis of the output from the detector 343, a calibrator 344 accesses the memory 341 and obtains and adjusts the amplification factor of the amplifier 314. Not only the amplification factor of the amplifier 314 but also a scale (indication value) of a flow rate indication plate or the like may be adjusted to coincide with the indication value of the calibrating flowmeter. In addition, the output from the flowmeter may be subjected to (dry) calibration by logical calculations. Note that calibration of an output from a flowmeter performed when a fluid to be measured is not a uniform flow (but a non-uniform flow including a drift component) is described in detail in Japanese Patent Publication (Kokoku) No. 57-59937 and can be applied to this embodiment.

Figure 41:
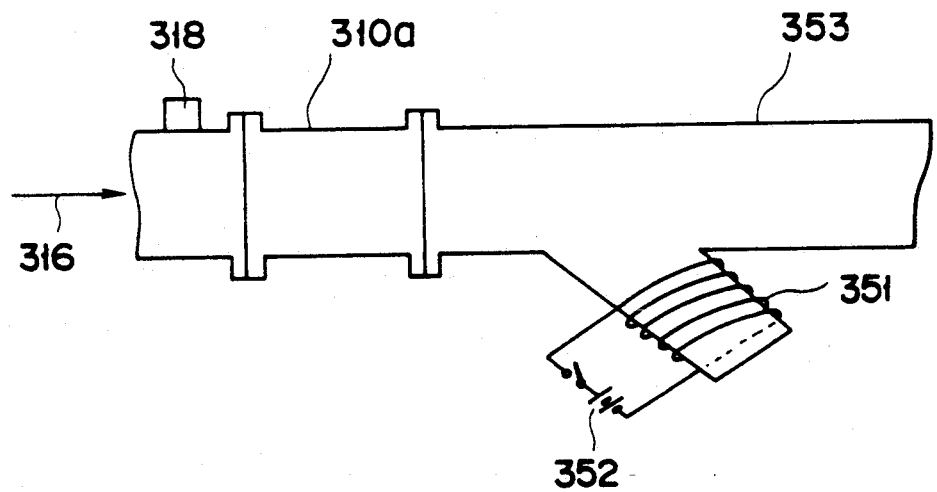

In FIG. 32 or 39, the solid substance particle inlet port 318 is formed at the upstream side of the spiral pipe 313. When a substance heavier than a fluid to be measured such as earth, sand, or gravels is mixed from the port into the fluid, the substance is centrifugally separated upon turning of the fluid and moved while it is urged against the inner surface of the measuring pipe. As a result, the inner surface of the measuring pipe of the flowmeter is abraded as if it is sand-papered or roughly rubbed, and an adhesive substance is removed. This function is effective when no heavy material is mixed in the fluid to be measured. When it is not preferable to mix a solid material such as earth, sand, or gravels into the fluid to be measured 316 in consideration of another system arranged on the downstream side of the flowmeter and the fluid to be measured is water, ice particles may be mixed in the fluid to be measured 316 from the solid substance inlet port 318. Since a specific gravity of the ice particles is substantially the same as that of water, no significant effect as obtained by earth, sand, or gravels cannot be obtained. However, the ice particles become a slurry flow to improve an effect of removing an adhesive substance. Since the ice melts after it contributes to cleaning, the system on the downstream side is not adversely affected. In place of ice particles, gravels or steel balls may be used. In this case, after the measuring pipe 310a is cleaned, a strainer-like solid material recovering unit may be connected to the downstream side of the flowmeter to recover the gravels or steel balls used in cleaning. When steel balls are to be mixed, a pipe 353 having a branch pipe may be connected to the downstream side of a measuring pipe 310a, and a magnet catch comprising a coil 351 and a power source 352 may be arranged at the branch pipe 353, thereby recovering the steel balls, as shown in FIG. 41. A gas such as air, $N_2$, or $CO_2$ may be mixed with the fluid to be measured.

Figures 42A, 42B:
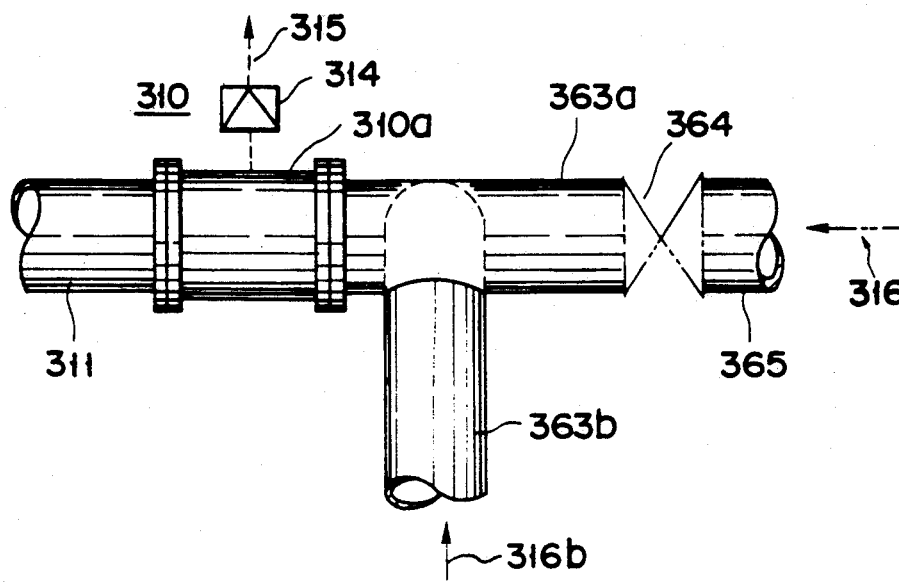

In FIGS. 32 and 39, the spiral pipe 313 is used as a permanent turning flow generator. However, the present invention is not limited to this embodiment. For example, FIGS. 42A and 42B show a permanent turning flow generator using a deformed T-shaped pipe. In this modification, a pipe 363b for injecting an additional fluid is connected to a position offset from the central axis of a main pipe 363a at a substantially right angle with respect to the main pipe 363a. The main pipe 363a is connected to a pipe 365 on the upstream side via a valve 364. With this arrangement, an additional fluid 316b is mixed in a main fluid 316a from a right angle direction so as to be offset from the axis of the main fluid 316a. For this reason, a fluid mixture flows in a measuring pipe 310a of a flowmeter 310 while it turns as shown in FIG. 42B.

Figure 43:
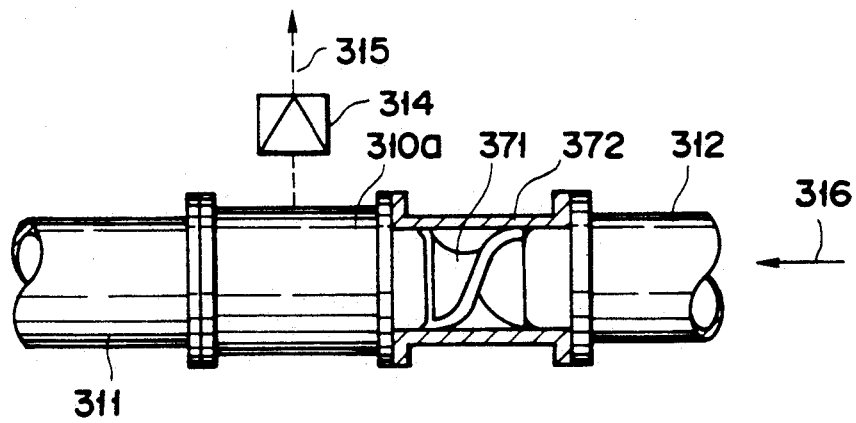

Referring to FIG. 43, a spiral member 371 having a shape as shown in FIG. 14 is permanently located in a pipe 372 connected to the upstream side of a measuring pipe 310a. This spiral member 371 causes a fluid to be measured 316 to turn and flow into the measuring pipe 310a.

Figure 44:
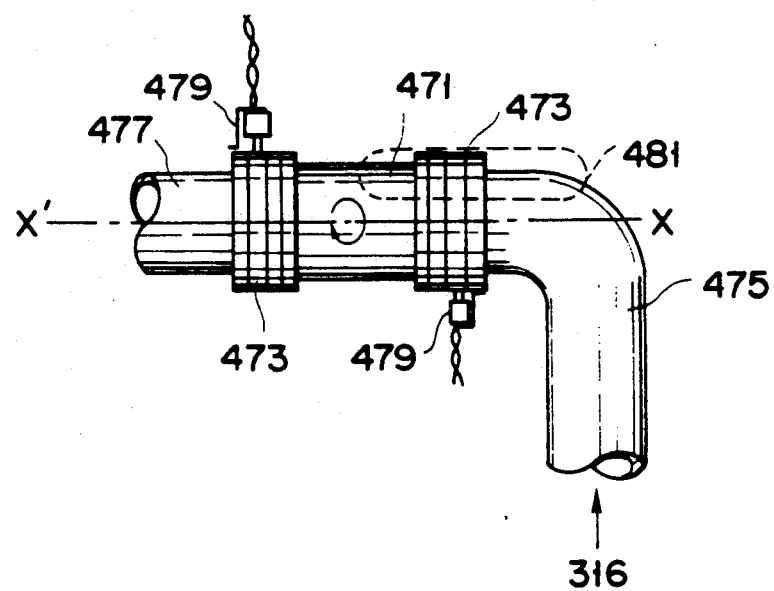

Referring to FIG. 44, a measuring pipe 471 of a flowmeter is connected to pipes 475 and 477 on the upstream and downstream sides via rotatable airtight joints 473. A motor 479 is mounted on each airtight joint 473, and a rotational force of the motor 479 is transmitted to the measuring pipe 471 via gears (not shown). The pipe 475 on the upstream side is bent through a substantially right angle near the measuring pipe 471. Upon rotation of the motor 479, the measuring pipe 471 is rotated about an axis x—x' of a fluid to be measured as a rotation axis. This method can also generate substantially a turning flow. In addition, since the upstream pipe 475 is bent through a substantially right angle, an adhesive substance at a portion surrounded by a broken line 481 can be easily removed. Therefore, by rotating the measuring pipe 471, the entire inner surface of the measuring pipe 471 can be cleaned.

5TH EMBODIMENT

Figure 45:
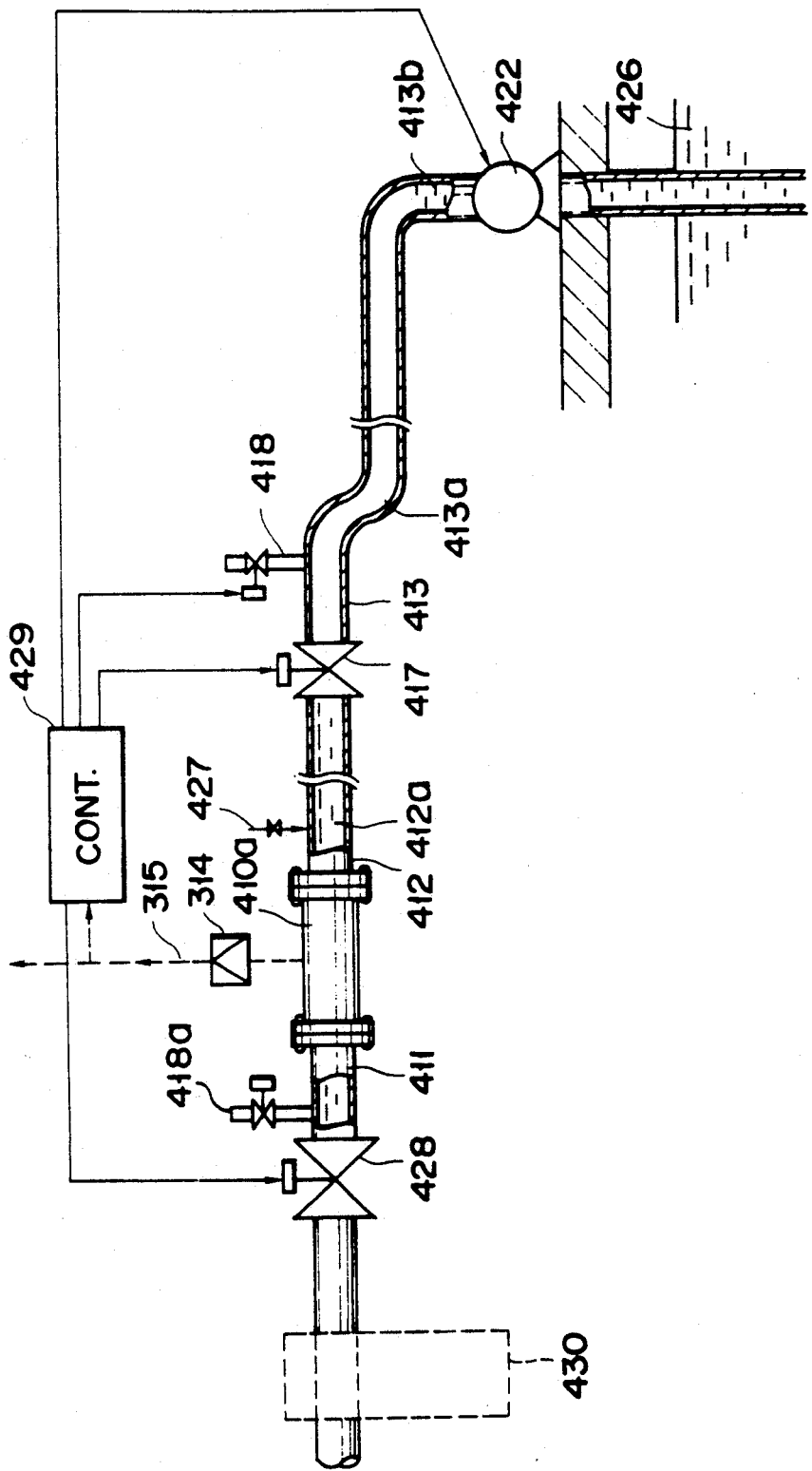
FIG. 45 is a view showing an arrangement of a flow rate measuring apparatus according to a fifth embodiment of the present invention.

When a speed of a fluid to be measured is very low, it is often difficult to sufficiently increase the speed of the fluid to be measured by, e.g., decreasing an effective sectional area of a measuring pipe. Therefore, this embodiment provides a flow rate measuring apparatus capable of increasing a flow speed of a fluid to be measured by using a compressed gas and strongly removing an adhesive substance even when the flow speed of the fluid is very low. An arrangement of the flow rate measuring apparatus according to this embodiment will be described below with reference to FIG. 45. A pipe system shown in FIG. 45 is for measuring a flow rate of a low-speed sewage flowing in a flowmeter at a flow speed of about 0.5 m/s or less. Assume that the flow speed of about 0.5 m/s (maximum) is determined by a volume of a pump (or by a head H in the case of a natural flow) and a flow speed of more than about 0.5 m/s cannot be obtained.

A fluid (in the present invention, a sewage) 426 such as a slurry is supplied to a pipe 413 by a pump 422. The fluid from the pipe 413 is supplied to a pipe 412 through a main valve 417 and to a sewage disposal plant located on the downstream side through the pipe 412, a measuring pipe 410a, a pipe 411, and a valve 428. A solid substance particle supply pipe 427 for supplying a granular substance into the pipes is connected to the pipe 412. A relief valve 418 is connected to the pipe 413. A cleaning controller 429 receives an output signal 315 from an amplifier 314 and controls the valves 417, 418, and 428, and the pump 422. The controller 429 comprises a microcomputer and its peripheral circuits.

In a normal state, the controller 429 keeps the valves 417 and 428 open and the valve 418 closed. A measuring pipe cleaning operation performed in the above pipe system will be described below. While the flowmeter is set in a measurement state, the cleaning controller 429 closes a main valve 417, stops the pump 422, and opens the relief valve 418. As a result, the fluid (liquid) in the pipe 413 flows backward through the pump 422, and air is filled in the pipe 413. The controller 429 then closes the main valve 417 and relief valve 418, and activates the pump 422 to supply the fluid 426 such as a slurry into the pipe 413 as indicated by reference numeral 413b. Air 413a in the pipe 413 is compressed by the fluid 413b, and therefore a pressure of the air 413a is increased. When the air 413a is sufficiently compressed, the controller 429 slightly opens the main valve 417. The compressed gas 413a is explosively supplied into the pipe 412 to push the fluid 412a into the pipe 412 at high speed toward the downstream side through the measuring pipe 410a. The fluid 412a is bubbled at a position at which the air 413a is supplied from the main valve 417 to the pipe 412. A mixture of a liquid and a gas is moved in the measuring pipe 410 at high speed to clean the interiors of the pipe 412 and the measuring pipe 410a, thereby removing an adhesive substance.

The cleaning controller 429 checks the signal 315 which the amplifier 314 outputs after the valve 414 has been opened. The output signal 315 remains at a normal level until a liquid-gas mixture starts flowing through the measuring pipe 410a. The signal 315 fluctuates in level as the liquid-gas mixture flows through the measuring pipe 410a. Then, the flow rate of the liquid decreases. When the signal 315 falls to one-third of the normal level, the cleaning controller 429 closes the valve 428 and opens the valve 418a. In this state, the pump 422 operates, thus expelling air from the pipes including the measuring pipe 410a, through the valve 418a. When the signal 315 rises to the normal level, the controller 429 opens the valves 417 and 428, and closes the valve 418a, thereby resetting the apparatus to the normal measuring mode.

Alternatively, to reset the apparatus to the normal measuring mode, the pump 422 is stopped, and the valves 428 and 427 while keeping the valves 418 and 418a open, thereby forcing air from the pipes including the measured pipe 410a through the pump 422, thus allowing the fluid to flow into the pipes.

With the above arrangement, the inner surface of the measuring pipe 410a can be cleaned. In addition, an unnecessarily large amount of the gas is not flowed into a sewage disposal plant or the like on the downstream side. Therefore, when a sludge settling pool or the like is located on the downstream side, a settling state in the pool is not disturbed. It is more preferable to provide a buffering water storage tank or pool 430 as indicated by a broken line in FIG. 45.

The valve 428 need not be closed on the basis of a measurement value of the flowmeter but can be closed when a predetermined time has elapsed by using a timer or the like. Alternatively, without using the valve 428, the fluid in the pipe 412 may be pushed by the compressed air 413a to flow toward the downstream side at high speed. In this case, the flowmeter supplies the output 315 while the fluid 412a passes therethrough and stops the signal 315 when a large amount of gas reaches the measuring pipe 410a. In addition, an operation may be performed such that measurement of the flowmeter is stopped during cleaning, a volume of a fluid to be cleaned in one cleaning cycle is measured in advance, and the measured volume is automatically added as a known amount to the measurement value of the flowmeter before of after cleaning.

Figure 46:
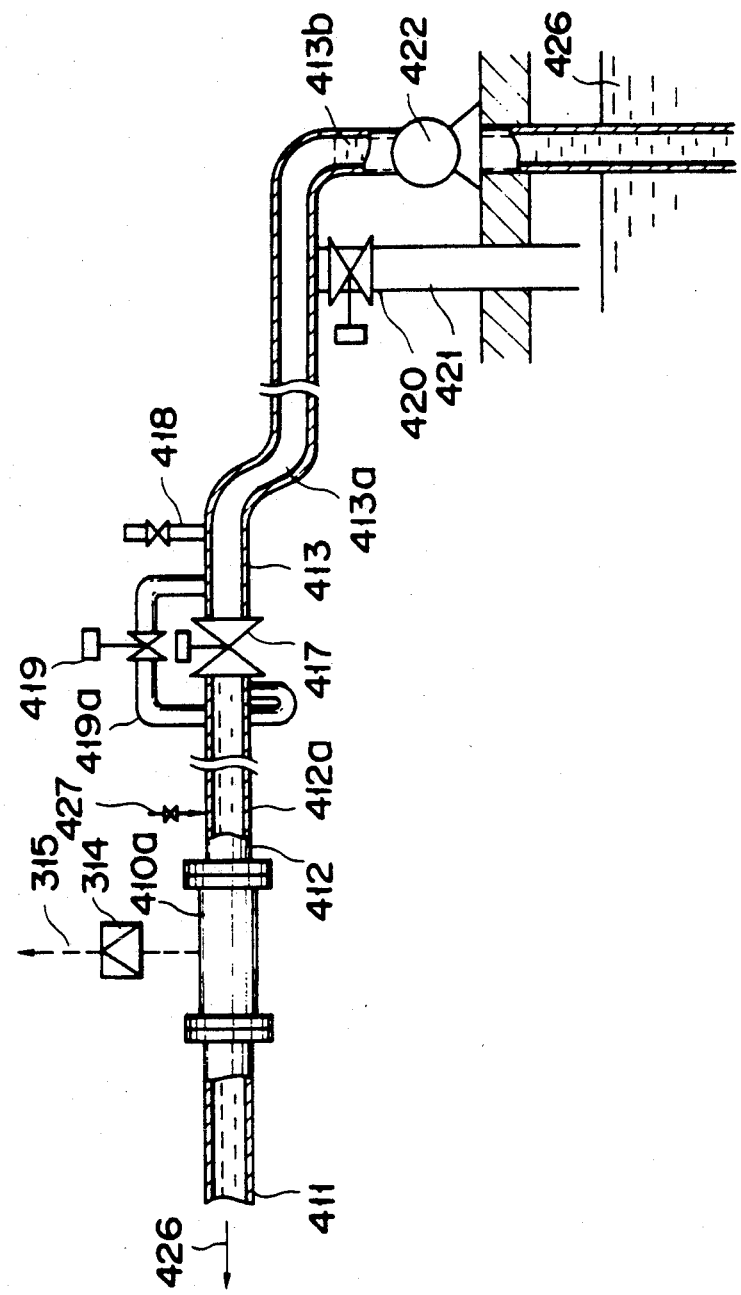
FIGS. 46, 47, and 48 are views showing modifications of the flow rate measuring apparatus shown in FIG. 45.

When the pump 422 is a centrifugal pump, water can flow backward if the pump stops. For this reason, when the pump 422 is a centrifugal pump, a fluid can be discharged from the pipe 413 when the pump 422 is stopped. When the pump 422 is of a type such as a plunger pump in which water does not flow backward, however, the fluid in the pipe 412 cannot be discharged in the arrangement shown in FIG. 45. In this case, as shown in FIG. 46, a flowback pipe 421 for discharging the fluid is connected to the pipe 413, and a valve 420 connected to the backflow pipe 421 is opened to discharge the fluid. Thereafter, the relief valve 418 and the valve 420 are closed and the pump 422 is operated to supply the fluid such as a slurry into the pipe 413. As a result, the same effect can be obtained.

When the main valve 417 is of a type such as a gate valve which cannot be driven when a pressure is applied to one side, the above effect cannot be obtained by the arrangement shown in FIG. 45. In this case, as shown in FIG. 46, the pipes 413 and 412 are connected by a communication pipe 419a having a valve 419, and the above operation is performed.

When a natural flow is to be used in place of the pump 422, the same effect can be obtained by providing a valve 431 on the upstream side of the relief valve 418. In this case, while the valve 431 or main valve 417 is slightly opened, air is supplied from the valve 418 into the pipe 413 to empty the pipe 413. The cleaning is initiated by opening the main valve 417 and by moving the fluid to be measured at high speed.

Figure 48:
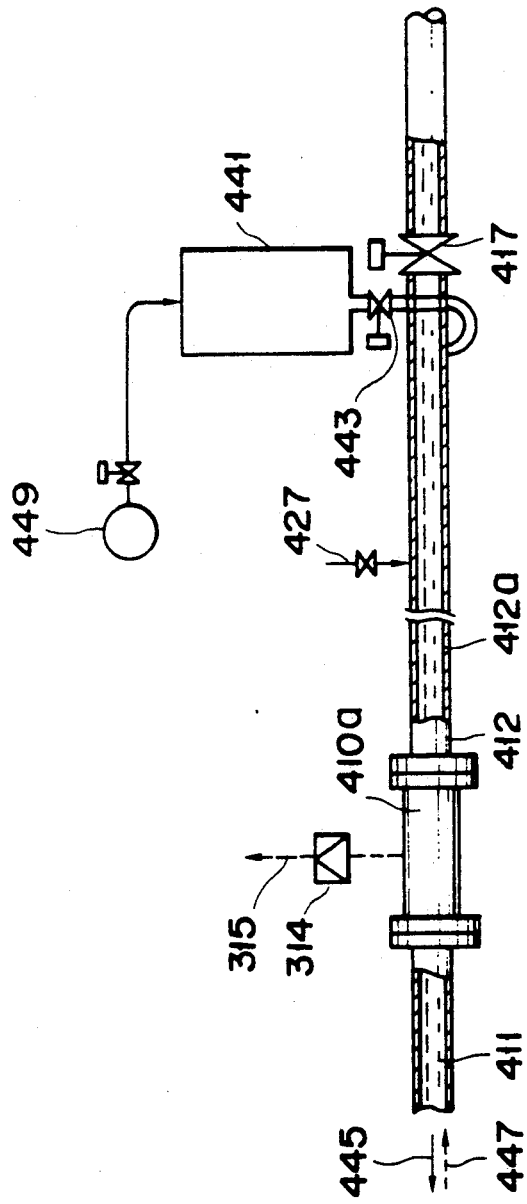

A modification of the system shown in FIG. 45 will be described below with reference to FIG. 48. Referring to FIG. 48, a high-pressure gas tank 441 is located outside a pipe system. The gas tank 441 is connected to a pipe 412 through a valve 443. In order to clean a measuring pipe 410a, the valve 443 is opened while a main valve 417 is closed. As a result, a compressed gas in the gas tank 441 is injected in the pipe 412 and mixed in a fluid 412a in the pipe 412. A mixture of the gas and fluid flows at high speed toward the downstream side as indicated by a solid line arrow 445, thereby cleaning the measuring pipe 410a.

The gas tank 441 must have a volume capable of flowing a fluid of an amount several times the volume of the fluid in the pipe 412.

An arrangement may be made such that the gas tank is connected to a pipe 411 on the downstream side and a valve is located on its downstream side. In this case, as indicated by a broken line arrow 447, a high-speed fluid is flowed in a direction opposite to a normal direction of the fluid to be measured.

Figure 47:
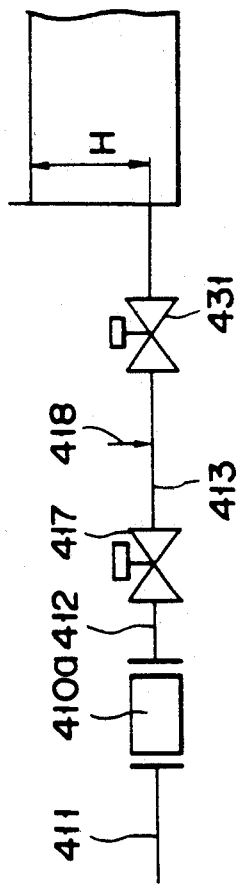

In FIGS. 45, 46, and 47, the pipes horizontally extend. The pipes, however, can vertically extend. In this case, the gas tank 441 is located below the measuring pipe 410a.

When couplings with valves for connecting the gas tank 441 are provided for arbitrary pipes, only one gas tank 441 need be prepared for a plurality of pipes, resulting in an efficient operation. A gas can be refilled in the gas tank 441 by using a compressor 449. Although air is generally used as the gas, a gas of another type can be used.

In this embodiment, by using a high-pressure gas, a pump larger than that required in a normal state need not be used or a head H need not be abnormally increased in the case of a natural flow. Therefore, a measuring pipe can be cleaned by only adding a simple sequence and a small amount of equipment to a flow rate measuring system not including a cleaning unit.

As has been described above, according to the present invention, an adhesive substance on the inner wall of a measuring pipe can be removed by inflating a balloon in a measuring pipe, by turning a fluid to be measured, or by flowing a fluid to be measured at high speed by using a high-pressure gas.

Note that the measuring pipe may or may not include a lining.

6TH EMBODIMENT

Figure 49:
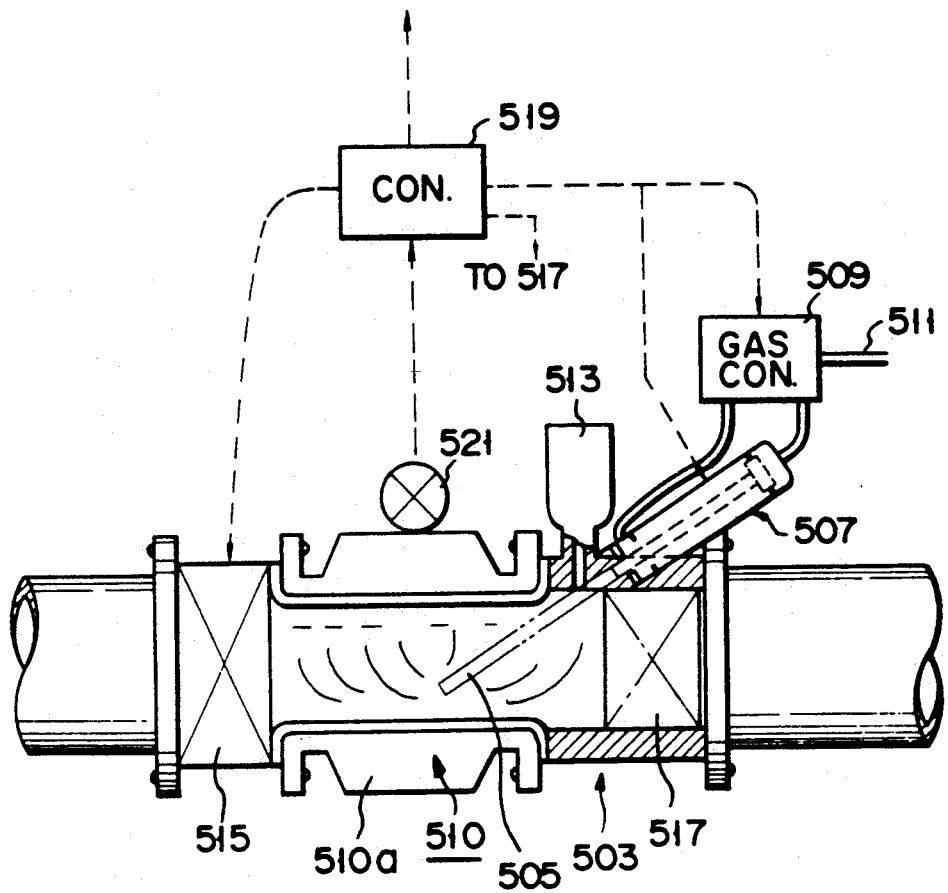
FIGS. 49, 50, and 51 are views showing an arrangement of a flow rate measuring apparatus according to a sixth embodiment of the present invention.

A flow rate measuring apparatus according to a sixth embodiment of the present invention will now be described with reference to FIG. 49. In FIG. 49, a gas injection device 503 is connected to an upstream side portion of a measuring pipe 510a (including a lining) of a flowmeter 510. The gas injection device 503 comprises a nozzle 505 for injecting gas into the measuring pipe 510a and a pushing/pulling device 507 for pushing/pulling the nozzle 505 into/from the flow path. The pushing/pulling device 507 is connected to a gas controller 509. The gas control device 509 is connected to a high-pressure gas source through a pipe 511. The gas injection device 503 is provided with a gas extraction valve 513. Valves 515 and 517 are mounted on the gas injection device 503. The structural elements of the apparatus are controlled by a controller 519.

The operation of the above apparatus will now be described. At the time of normal flow rate measurement, the valves 515 and 517 are opened by the controller 519, and the nozzle 505 is pulled in the pushing/pulling device 507. A signal produced from an electrode 521 is output through the controller 519.

At the time of cleaning of the pipe, the valves 515 and 519 are closed by the controller 519, and the nozzle 505 is pushed out of the pushing/pulling device 507. Then, the controller 519 causes the gas controller 509 to inject gas into the pushing/pulling device 507. The injected gas is supplied into the measuring pipe 510a through the nozzle 505. The injected gas is caused to bubble in the fluid to be measured. The bubbling gas is escaped from the valve 513. The inner surface of the measuring pipe 510a is cleaned by the mixture of bubbling gas and the fluid. During the cleaning, the controller 519 does not output a flow rate signal.

In a general sewage disposal plant, a pump is driven intermittently. In such a plant, the pipe can be cleaned while the pump is stopped. Alternatively, the pipe can be cleaned after the controller 519 detected that the flow rate of the fluid to be measured reached a predetermined value and the pump was stopped.

Figure 50:
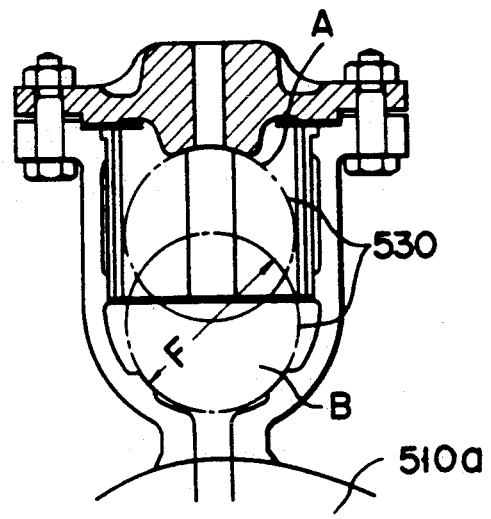

FIG. 50 is a cross section showing an example of the structure of the valve 513. A float is normally located in the position A. When gas is injected into the measuring pipe 510a and the pressure within the measuring pipe rises, the float 530 is raised, and the gas within the measuring pipe 510a is escaped. On the other hand, when the liquid level rises and the float shifts to the position B, the liquid is sealed.

Figure 51:
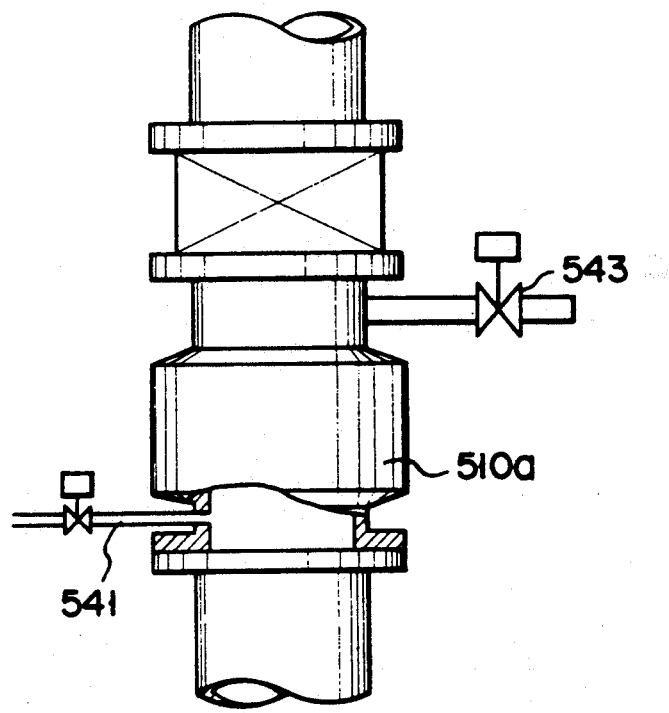

FIG. 51 shows an example of a vertical-type flow rate measuring apparatus. In this example, gas is injected from a nozzle 541 into the measuring pipe 510a, and the injected gas is extracted through a valve 543.

In the above description, the flow of the fluid to be measured was stopped at the time of cleaning. However, gas may be injected into the measuring pipe 510a while about 10% of the fluid is caused to flow. When the pressure of gas injected into the measuring pipe 510a is sufficiently high, the inner surface of the pipe may be cleaned while the fluid flows.

Figure 52:
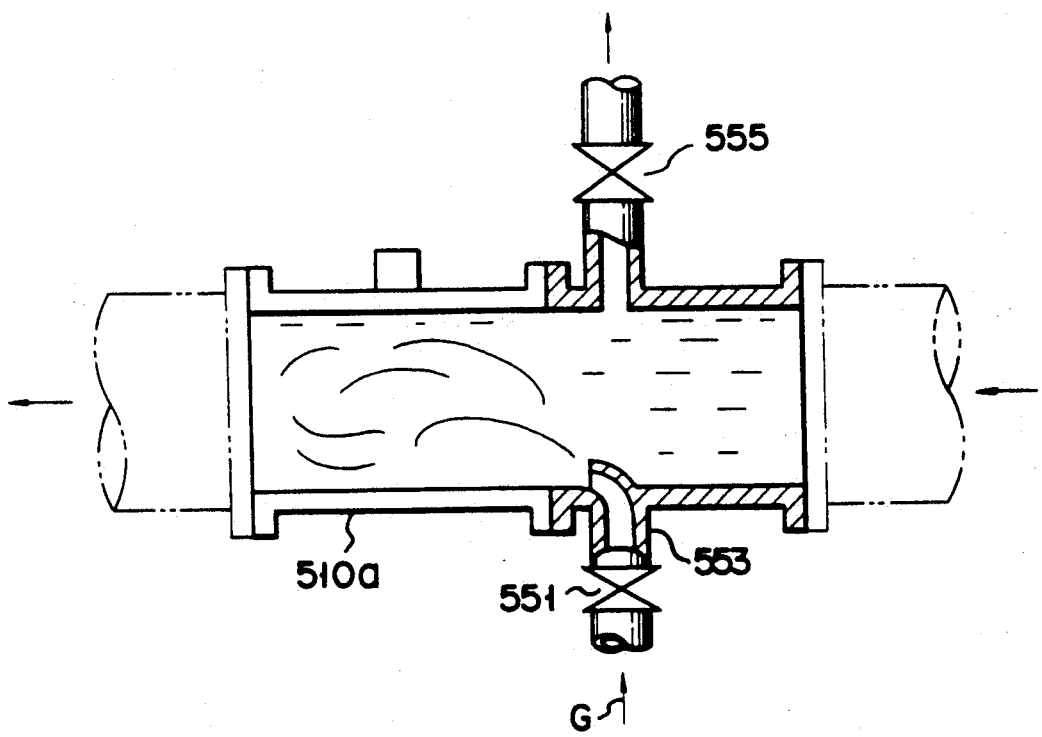
FIG. 52 is a view showing a modification of the flow rate measuring apparatus shown in FIG. 49.

FIG. 52 shows a modification of the apparatus shown in FIG. 49. In the modification of FIG. 52, a large amount of gas G is injected into the pipe, and the fluid to be measured is bubbled to clean the measuring pipe 510a. The gas G is injected through a valve 551 and a nozzle 553. When the flow of the fluid is stopped and the gas is injected into the pipe, split liquid is taken out through a valve 555. When the gas is injected into the pipe while the fluid flows, the valve 555 is not necessary. When the gas is injected into the pipe while the fluid flows, it is desirable that the gas be injected intermittently. In this case, an indicated value of the flowmeter obtainable when the gas is not injected is sampled, and this indicated value is output while the gas is injected.

In the case of a plant wherein gas must be prevented from being supplied from the flowmeter to the pipe, a suitable gas escape device is arranged on the downstream side of the flow rate measuring apparatus.

In the case where the flow rare of the fluid is too high, the injected gas is carried off by the fluid, and the effective cleaning cannot be performed. In order to prevent this undesirable situation from occurring, it is advisable to find, in advance, the relationship between the flow rate and the cleaning effect by experiments, and to automatically inject gas into the pipe when the flow rate reaches a value at which the cleaning effect becomes high. In addition, the inlet of gas may be located on the downstream side of the flowmeter. If the gas is injected into the pipe when the fluid flows at a low flow rate, the gas is pushed back by the fluid and is caused to stay in the flowmeter for a relatively long time.

It is also possible to inject gas into the pipe while the nozzle for supplying gas is extended into the fluid. Furthermore, the level of an outlet of the nozzle may be determined in relation to the flow rate of fluid.

The present invention is not limited to the above embodiments but can be variously modified without departing from the spirit and scope of the invention.

What is claimed is:

1. A flow rate measuring apparatus comprising:

flow rate measuring means including measuring pipe means in which a fluid to be measured flows, for measuring a flow rate of the fluid to be measured flowing in said measuring pipe means; and removing means for removing an adhesive substance of said measuring pipe means by using the fluid to be measured;

said removing means including means for injecting a high-pressure gas into said measuring pipe means wherein:

said measuring pipe means is connected to a pipe system; and said removing means includes:

valve means for opening and closing a path of the pipe system, means for inserting a gas into said pipe system, means for increasing pressure of the gas, and means for opening the valve means when the gas pressure reaches a certain level, thereby injecting the high-pressure gas into the fluid to be measured in the measuring pipe means.

2. In a flow rate measuring apparatus, a method for removing an adhesive substance of a measuring pipe means through which a fluid to be measured flows, comprising:

closing a valve means connecting the flow rate measuring apparatus and a pipe system;

introducing air into the pipe system after closing the valve means;

increasing the pressure of the air after introducing the air into the pipe system; and opening the valve means to inject the air having increased pressure into the measuring pipe means.

* * * * *

UNITED STATES PATENT AND TRADEMARK OFFICE
CERTIFICATE OF CORRECTION

PATENT NO. : 5,237,865
DATED : August 24, 1993
INVENTOR(S) : Ichiro Wada

It is certified that error appears in the above-indentified patent and that said Letters Patent is hereby corrected as shown below:

On the title page, Item [30],

The Foreign Application Priority Data, should read:

--Jul. 14, 1988 [JP] Japan....................63-92511[U]--

Signed and Sealed this

Fifth Day of April, 1994

BRUCE LEHMAN

Attest:

*Attesting Officer*              *Commissioner of Patents and Trademarks*